US012804455B2

(12) United States Patent
Yi et al.

(10) Patent No.: US 12,804,455 B2
(45) Date of Patent: Nov. 17, 2026

(54) WIRELESS ROUTING METHOD AND DEVICE

(71) Applicant: 1Finity Inc., Kawasaki (JP)

(72) Inventors: Su Yi, Beijing (CN); Meiyi Jia, Beijing (CN); Yang Lu, Beijing (CN)

(73) Assignee: 1FINITY Inc., Kawasaki (JP)

( * ) Notice: Subject to any disclaimer, the term of this patent is extended or adjusted under 35 U.S.C. 154(b) by 276 days.

(21) Appl. No.: 18/630,629

(22) Filed: Apr. 9, 2024

(65) Prior Publication Data

US 2024/0259866 A1 Aug. 1, 2024

Related U.S. Application Data

(63) Continuation of application No. PCT/CN2021/123114, filed on Oct. 11, 2021.

(51) Int. Cl.

| | |
|---|---|
| ***H04W 28/02*** | (2009.01) |
| ***H04W 40/24*** | (2009.01) |
| ***H04W 76/20*** | (2018.01) |
| *H04W 88/08* | (2009.01) |

(52) U.S. Cl.

CPC ..... *H04W 28/0273* (2013.01); *H04W 40/248* (2013.01); *H04W 76/20* (2018.02); *H04W 88/08* (2013.01)

(58) Field of Classification Search

CPC ............. H04W 28/0273; H04W 76/20; H04W 40/248; H04W 88/08

See application file for complete search history.

(56) References Cited

U.S. PATENT DOCUMENTS

| | | | | |
|---|---|---|---|---|
| 2015/0222528 | A1 | 8/2015 | Lotfi et al. | |
| 2020/0221329 | A1* | 7/2020 | Kim | H04W 12/037 |
| 2020/0351749 | A1* | 11/2020 | Tesanovic | H04L 45/48 |
| 2020/0413457 | A1* | 12/2020 | Hong | H04W 76/10 |
| 2021/0014768 | A1* | 1/2021 | Hong | H04W 40/22 |
| 2021/0058826 | A1* | 2/2021 | Mao | H04L 45/24 |
| 2021/0306929 | A1 | 9/2021 | Koskinen | |
| 2022/0078663 | A1* | 3/2022 | Luo | H04L 47/283 |
| 2022/0124652 | A1* | 4/2022 | Wanuga | H04W 56/0015 |

(Continued)

FOREIGN PATENT DOCUMENTS

| | | | |
|---|---|---|---|
| WO | 2020/222513 | A1 | 11/2020 |
| WO | 2021/027949 | A1 | 2/2021 |

(Continued)

OTHER PUBLICATIONS

The Extended European search report with the Supplementary European search report and the European search opinion, issued by the European Patent Office for corresponding European Patent Application No. 21960152.3, mailed on Nov. 4, 2024.

(Continued)

*Primary Examiner* — Jael M Ulysse

(74) *Attorney, Agent, or Firm* — Myers Wolin, LLC

(57) ABSTRACT

Embodiments of this disclosure provide a wireless routing method and device. The method is applicable to a first IAB-node and includes: for data in an upstream direction, selecting an egress link without looking up a routing table, or, when a routing ambiguity occurs in looking up a routing table, selecting an egress link without using the routing table; and performing routing according to a selected egress link.

18 Claims, 14 Drawing Sheets

(56) References Cited

U.S. PATENT DOCUMENTS

| | | | | |
|---|---|---|---|---|
| 2022/0131806 | A1 * | 4/2022 | Akl | H04L 47/24 |
| 2022/0132390 | A1 * | 4/2022 | Akl | H04L 45/52 |
| 2022/0132391 | A1 * | 4/2022 | Akl | H04L 45/74 |
| 2022/0132393 | A1 * | 4/2022 | Akl | H04L 45/04 |
| 2022/0225166 | A1 * | 7/2022 | Akl | H04W 28/0263 |
| 2022/0393966 | A1 * | 12/2022 | Eriksson | H04L 45/24 |
| 2023/0007565 | A1 * | 1/2023 | Mildh | H04W 40/24 |
| 2023/0232285 | A1 * | 7/2023 | Barac | H04W 36/0009 370/331 |
| 2023/0337110 | A1 * | 10/2023 | Lee | H04W 40/22 |
| 2023/0403067 | A1 * | 12/2023 | Visa | H04B 7/15592 |
| 2023/0403662 | A1 * | 12/2023 | Wanuga | H04W 56/0015 |
| 2024/0114496 | A1 * | 4/2024 | Huang | H04B 7/15542 |
| 2024/0172085 | A1 * | 5/2024 | Diao | H04W 40/22 |
| 2024/0179610 | A1 * | 5/2024 | Sun | H04L 45/02 |
| 2024/0205794 | A1 * | 6/2024 | Wen | H04W 40/32 |
| 2024/0349168 | A1 * | 10/2024 | Akl | H04L 45/04 |
| 2024/0396832 | A1 * | 11/2024 | Visa | H04W 40/248 |

FOREIGN PATENT DOCUMENTS

| | | | |
|---|---|---|---|
| WO | 2021/062627 | A1 | 4/2021 |
| WO | 2021/134723 | A1 | 7/2021 |
| WO | 2021/192917 | A1 | 9/2021 |

OTHER PUBLICATIONS

Qualcomm Incorporated, "Backhaul transport for inter-donor redundancy", Agenda Item: 12.2.3, 3GPP TSG-RAN WG3 Meeting #112-e, R3-211741, E-meeting, May 17-28, 2021.

Nokia et al., "discussion on Inter-CU topology redundancy", Agenda Item: 13.2.3, 3GPP TSG-RAN WG3 Meeting #111-e, R3-210489, Jan. 25-Feb. 4, 2021.

International Search Report with the Written Opinion of the International Searching Authority, issued by the China National Intellectual Property Administration for corresponding International Patent Application No. PCT/CN2021/123114, mailed on May 27, 2022, with an English translation.

3GPP TS 38.340 V16.5.50, "3rd Generation Partnership Project; Technical Specification Group Radio Access Network; NR; Backhaul Adaptation Protocol (BAP) specification (Release 16)" Jun. 2021.

Notice of Reasons for Refusal issued by the Japan Patent Office for corresponding Japanese Patent Application No. 2024-521201, mailed on Feb. 12, 2025, with an English translation.

* cited by examiner

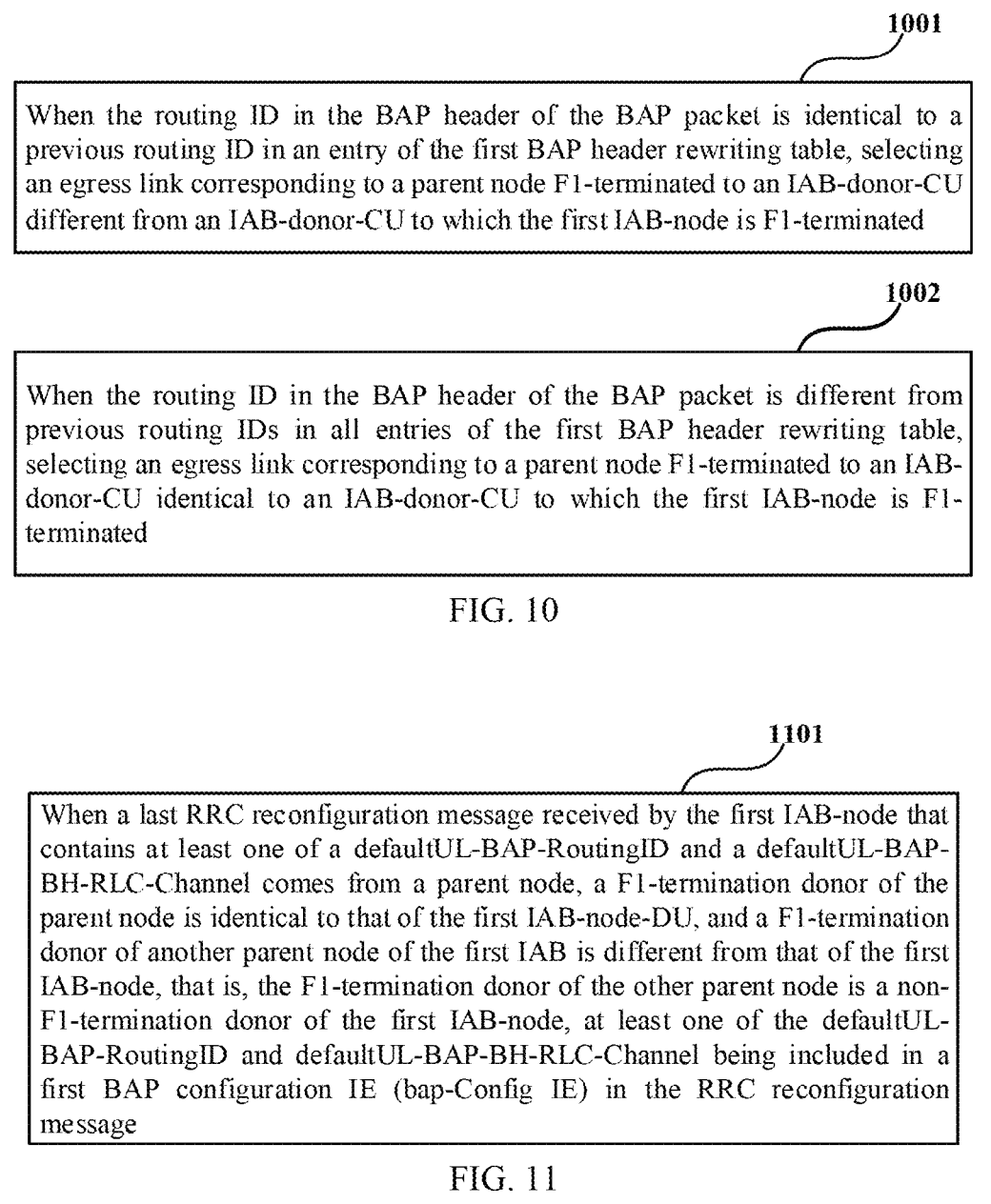

1001

When the routing ID in the BAP header of the BAP packet is identical to a previous routing ID in an entry of the first BAP header rewriting table, selecting an egress link corresponding to a parent node F1-terminated to an IAB-donor-CU different from an IAB-donor-CU to which the first IAB-node is F1-terminated

1002

When the routing ID in the BAP header of the BAP packet is different from previous routing IDs in all entries of the first BAP header rewriting table, selecting an egress link corresponding to a parent node F1-terminated to an IAB-donor-CU identical to an IAB-donor-CU to which the first IAB-node is F1-terminated

FIG. 10

1101

When a last RRC reconfiguration message received by the first IAB-node that contains at least one of a defaultUL-BAP-RoutingID and a defaultUL-BAP-BH-RLC-Channel comes from a parent node, a F1-termination donor of the parent node is identical to that of the first IAB-node-DU, and a F1-termination donor of another parent node of the first IAB is different from that of the first IAB-node, that is, the F1-termination donor of the other parent node is a non-F1-termination donor of the first IAB-node, at least one of the defaultUL-BAP-RoutingID and defaultUL-BAP-BH-RLC-Channel being included in a first BAP configuration IE (bap-Config IE) in the RRC reconfiguration message

FIG. 11

WIRELESS ROUTING METHOD AND DEVICE

CROSS-REFERENCE TO RELATED APPLICATION

This application is a continuation application of International Application PCT/CN2021/123114, filed on Oct. 11, 2021, and designated the U.S., the entire contents of which are incorporated herein by reference.

TECHNICAL FIELD

This disclosure relates to the field of communication technologies.

BACKGROUND

Integrated access and backhaul (IAB) realizes a function of wireless relay in a next generation radio access network (NG-RAN). This relay node is referred to as an IAB-node, which simultaneously supports access and backhaul (BH) via New Radio (NR). The IAB-node is connected to an IAB-donor via one or more hops. These multi-hop connections form a directed acyclic graph (DAG) topology with an IAB-donor as a root node. The IAB-donor is responsible for executing centralized resource management, topology management and routing management in an IAB network topology.

The IAB-node supports a function of a gNB-DU (distributed unit), an IAB-node DU is also referred to as an IAB-DU. The IAB-DU may serve for a common user equipment (UE) and IAB child node. The IAB-node supports some functions of the UE, referred to as an IAB-MT (mobile termination). The IAB-MT may support such functions as a UE physical layer, an access stratum (AS), a radio resource control (RRC) layer and a non-access stratum (NAS), and may be connected to an IAB parent node. A terminating node at a network side is referred to as an IAB-donor, which provides access to a network for the IAB-MT or the UE via a backhaul or access link. The IAB-donor is further divided into an IAB-donor-CU (central unit) and an IAB-donor-DU. The IAB-DU and IAB-donor-CU are connected via an F1 interface. In a scenario of independent networking, a gNB and the IAB-donor-CU are connected via an Xn interface.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In order to support multi-hop routing forwarding of data packets, IAB has introduced a backhaul adaptation protocol (BAP) sublayer. The BAP sublayer is located above a radio link control RLC sublayer and below a network protocol IP layer, and supports such functions as packet destination node and path selection, packet routing forwarding, bearer mapping, flow control feedback, and backhaul link failure notification, etc.

In a multi-hop scenario, in order to realize relay forwarding of data packets, an IAB-node needs to determine a destination node at which the data packets arrive, and then determines a next hop of node corresponding to the destination node according to a BAP routing table and transmits. The routing table is also referred to as a backhaul (BH) routing configuration. A donor-CU, via F1AP signaling, configures an IAB-node with mapping from an uplink F1-U tunnel, a non-UE-associated F1AP message, a UE-associated F1AP message and a non-F1 traffic initiated by the IAB-node to a BAP routing identifier. The IAB-node determines BAP routing identifiers to which different types of uplink IP packets initiated from the IAB-node correspond according to routing identifier mapping information, and encapsulates BAP subheaders (also referred to as BAP headers) containing the BAP routing identifier information for the uplink IP packets. A donor-CU configures mapping from different types of downlink packets to the BAP routing identifiers for a donor-DU via F1AP signaling. The donor-DU determines BAP routing identifiers to which received downlink IP packets correspond according to the routing identifier mapping information, and encapsulates downlink BAP subheaders containing the BAP routing identifiers for these downlink IP packets.

The BAP routing identifiers include a destination BAP address and an identifier of a path between the IAB-node and the donor-DU. The BAP address is also referred to as a destination in the BAP header. Each IAB-node and donor-DU are configured with a BAP address.

It was found by the inventors that existing BAP routing is managed and configured by a donor-CU of a topology of its own. A BAP address of each IAB-node is configured by the donor-CU managing the IAB-node via RRC signaling. In cross-topology transmission, BAP address conflicts or routing identifier conflicts may possibly occur in certain scenarios, thereby leading to routing ambiguity.

In order to solve one or more of the above problems, embodiments of this disclosure provide a wireless routing method and device, in which for data in an upstream direction, an egress link is selected without looking up a routing table, or, when a routing ambiguity occurs in looking up a routing table, an egress link is selected without using the routing table and routing is performed, thereby avoiding routing ambiguities resulted from BAP address conflicts or routing identifier conflicts, and supporting various scenarios of cross-topology transmissions.

According to a first aspect of the embodiments of this disclosure, there is provided a wireless routing device, applicable to a first IAB-node, the device including: a selecting unit configured to, for data in an upstream direction, select an egress link without looking up a routing table, or, when a routing ambiguity occurs in looking up a routing table, select an egress link without using the routing table; and a first routing unit configured to perform routing according to a selected egress link.

According to a second aspect of the embodiments of this disclosure, there is provided a wireless routing device, applicable to a first IAB-node, the device including: a second routing unit configured to, when a receiving part of a BAP entity of the first IAB-node receives a BAP data packet and delivers the BAP data packet to a transmitting part of a collocated BAP entity, only selects and routes an egress link to which a node connected to the collocated BAP entity corresponds.

According to a third aspect of the embodiments of this disclosure, there is provided an apparatus for configuring a BAP address, the apparatus including: a first configuring unit provided in a first IAB-donor-CU and configured to configure a BAP address for a DU of a first IAB-node; and a second configuring unit provided in a second IAB-donor-CU and configured to configure a BAP address for an MT of the first IAB-node.

According to a fourth aspect of the embodiments of this disclosure, there is provided an apparatus for configuring a BAP address, the apparatus including: a third configuring unit configured not to change a BAP address under management of the same IAB-donor-CU after configuring the BAP address for a BAP entity of an IAB-node.

According to a fifth aspect of the embodiments of this disclosure, there is provided a network device, including the device as described in the embodiment of the first aspect of this disclosure.

According to a sixth aspect of the embodiments of this disclosure, there is provided a network device, including the device/apparatus as described in the embodiment of the second or third or fourth aspect of this disclosure.

According to a seventh aspect of the embodiments of this disclosure, there is provided a communication system, including the network device as described in the embodiment of the fifth aspect of this disclosure and/or the network device as described in the embodiment of the sixth aspect of this disclosure and a terminal equipment.

According to an eighth aspect of the embodiments of this disclosure, there is provided a wireless routing method, applicable to a first IAB-node, the method including: for data in an upstream direction, selecting an egress link without looking up a routing table, or, when a routing ambiguity occurs in looking up a routing table, selecting an egress link without using the routing table; and performing routing according to a selected egress link.

According to a ninth aspect of the embodiments of this disclosure, there is provided a wireless routing method, applicable to a first IAB-node, the method including: when a receiving part of a BAP entity of the first IAB-node receives a BAP data packet and delivers the BAP data packet to a transmitting part of a collocated BAP entity, only selecting and routing an egress link to which a node connected to the collocated BAP entity corresponds.

According to a tenth aspect of the embodiments of this disclosure, there is provided a method for configuring a BAP address, the method including: configuring a BAP address for a DU of a first IAB-node by a first IAB-donor-CU; and configuring a BAP address for an MT of the first IAB-node by a second IAB-donor-CU.

According to an eleventh aspect of the embodiments of this disclosure, there is provided a method for configuring a BAP address, the method including: not changing a BAP address under management of the same IAB-donor-CU after configuring the BAP address for a BAP entity of an IAB-node.

According to a twelfth aspect of the embodiments of this disclosure, there is provided a computer readable program code, which, when executed in a wireless routing device or a network device, will cause the wireless routing device or the network device to carry out the wireless routing method as described in the eighth or ninth aspect of the embodiments of this disclosure.

According to a thirteenth aspect of the embodiments of this disclosure, there is provided a computer readable medium, including a computer readable program code, which will cause a wireless routing device or a network device to carry out the wireless routing method as described in the eighth or ninth aspect of the embodiments of this disclosure.

According to a fourteenth aspect of the embodiments of this disclosure, there is provided a computer readable program code, which, when executed in an apparatus for configuring a BAP address or a network device, will cause the apparatus for configuring a BAP address or the network device to carry out the method for configuring a BAP address as described in the tenth or eleventh aspect of the embodiments of this disclosure.

According to a fifteenth aspect of the embodiments of this disclosure, there is provided a computer readable medium, including a computer readable program code, which will cause an apparatus for configuring a BAP address or a network device to carry out the method for configuring a BAP address as described in the tenth or eleventh aspect of the embodiments of this disclosure.

An advantage of the embodiments of this disclosure exists in that for data in an upstream direction, an egress link is selected without looking up a routing table, or, when a routing ambiguity occurs in looking up a routing table, an egress link is selected without using the routing table and routing is performed, thereby avoiding routing ambiguities resulted from BAP address conflicts or routing identifier conflicts, and supporting various scenarios of cross-topology transmissions.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 10 is a schematic diagram of a method for implementing step 901 of embodiment 1 of this disclosure;

FIG. 11 is a schematic diagram of a method for determining whether a parent node and a first IAB-node are F1-terminated to the same IAB-donor-CU of embodiment 1 of this disclosure;

DETAILED DESCRIPTION

Figure 1:
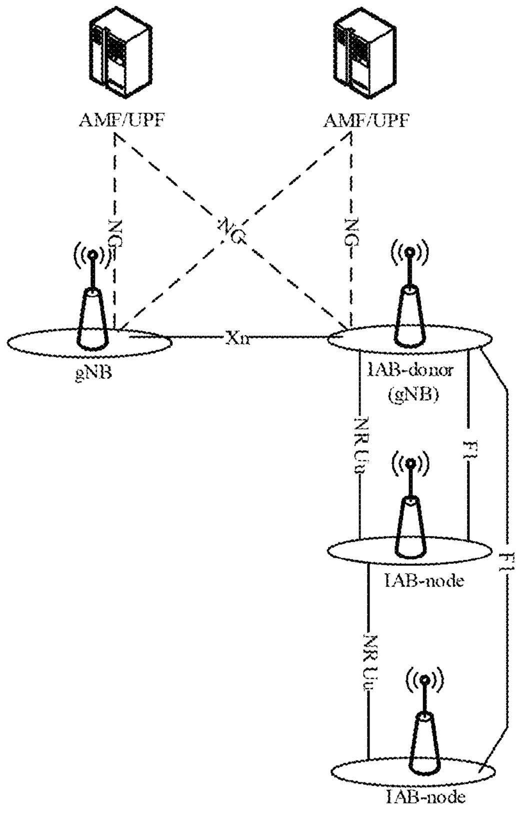
FIG. 1 is a schematic diagram of an overall architecture of IAB of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following devices: a node and/or donor in an IAB architecture, a base station (BS), an access point (AP), a transmission reception point (TRP), a broadcast transmitter, a mobile management entity (MME), a gateway, a server, a radio network controller (RNC), a base station controller (BSC), etc.

Wherein, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc., such as a terminal equipment served by an IAB-node or an IAB-donor-node under an IAB architecture.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In the embodiments of this disclosure, all of "when . . . ", "in a case where . . . ", "for a case where . . . " and "if . . . " denote one or some conditions or states, and furthermore, all of these expressions are interchangeable.

Scenarios of the embodiments of this disclosure shall be described below by way of examples; however, this disclosure is not limited thereto.

Figure 2:
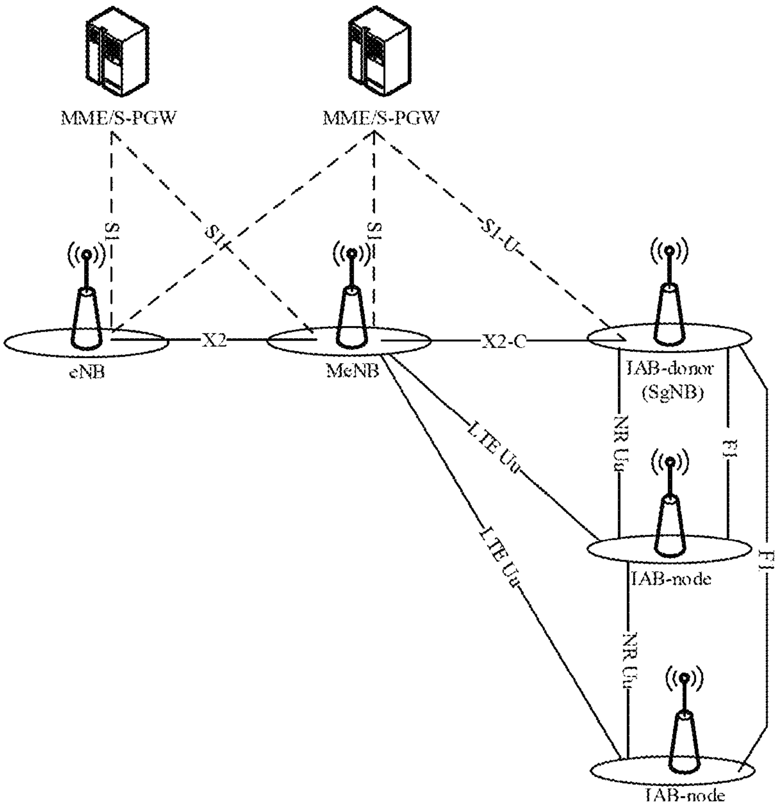
FIG. 2 is another schematic diagram of the overall architecture of the IAB of the embodiment of this disclosure.

FIG. 1 is a schematic diagram of an overall architecture of an IAB in an embodiment of this disclosure. As shown in FIG. 1, the overall architecture of the IAB is in a standalone (SA) mode. FIG. 2 is another schematic diagram of the overall architecture of the IAB of the embodiment of this disclosure. As shown in FIG. 2, the overall architecture of the IAB is in a dual-connectivity (EN-DC) mode. In the dual-connectivity mode, the IAB-node is connected to an MeNB via E-UTRA, and an IAB-donor terminates X2-C as an SgNB.

Figure 3:
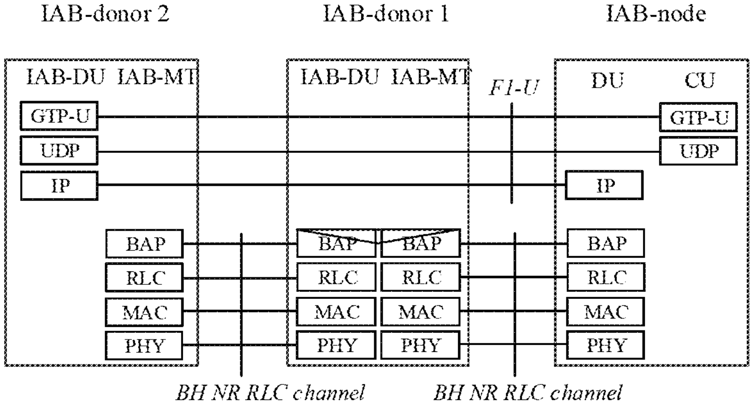
FIG. 3 is a schematic diagram of a protocol stack of an F1-U interface between an IAB-DU and an IAB-donor-CU.
Figure 4:
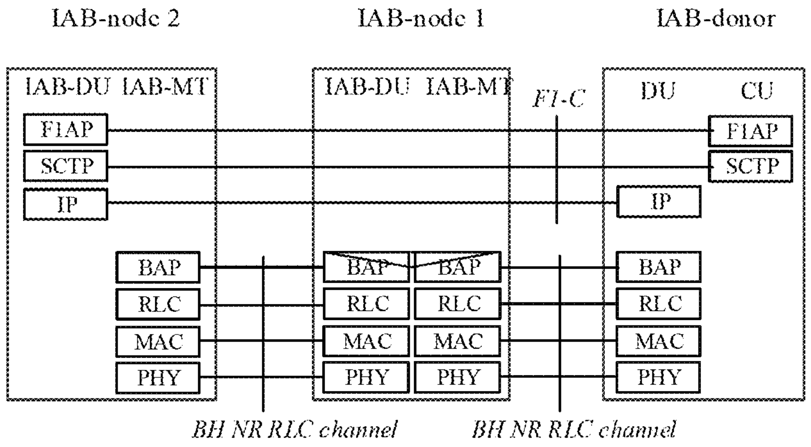
FIG. 4 is a schematic diagram of a protocol stack of an F1-C interface between an IAB-DU and an IAB-donor-CU.

FIG. 3 is a schematic diagram of a protocol stack of an F1-U interface between an IAB-DU and an IAB-donor-CU, and FIG. 4 is a schematic diagram of a protocol stack of an F1-C interface between an IAB-DU and an IAB-donor-CU. In FIG. 3 and FIG. 4, F1-U and F1-C are illustrated by taking 2-hop backhaul as an example.

In the embodiment of this disclosure, F1-U and F1-C use an IP transmission layer between the IAB-DU and IAB-donor-CU. In addition, F1-U and F1-C have security protection.

In the embodiment of this disclosure, the IP layer transmits via a BAP sublayer on wireless backhaul to ensure multi-hop routing; and the IP layer may also be used for non-F1 services, such as operation administration and maintenance (OAM) services.

In the embodiment of this disclosure, BAP PDUs are transmitted via BH RLC channels on each backhaul link, and on each BH link, multiple BH RLC channels may be configured to allow traffic prioritization and QoS (quality of service) enforcement.

In the embodiment of this disclosure, each IAB-node and a BAP entity on the IAB-donor-DU perform mapping of the BH RLC channels of the BAP PDUs.

Application scenarios of the embodiments of this disclosure shall be illustrated below.

3GPP has decided to support the following two cases to achieve inter-donor topology redundancy or inter-CU topology redundancy. In principle, one IAB-DU is only able to have an F1 interface with one donor-CU. Case 1: there exists multi-connectivity between an IAB-node and two IAB-donors; and case 2: there simultaneously exists multi-connectivity between a parent and/or ancestor node of an IAB-node and two IAB-donors.

Figure 5:
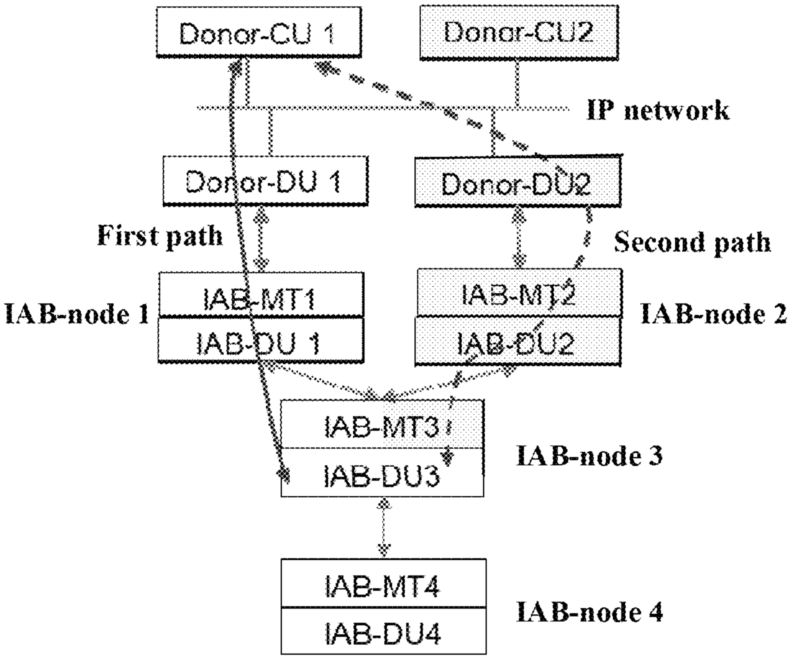
FIG. 5 is a schematic diagram of application scenario 1 as an example of the embodiment of this disclosure.

FIG. 5 is a schematic diagram of application scenario 1 as an example of the embodiment of this disclosure. As shown in FIG. 5, what is shown is a scenario of inter-donor topology redundancy. IAB-node 3 is a dual-connectivity node that is simultaneously connected to donor-CU1 and donor-CU2. An IAB-DU (IAB-DU3) of IAB-node 3 and a parent node DU (IAB-DU2) are F1-terminated at different IAB-donor-CUs, that is, they are F1-terminated at donor-CU1 and donor-CU2 respectively. In the embodiment of this disclosure, IAB-node 3 may be referred to as a boundary IAB-node.

As shown in FIG. 5, the IAB-DU (IAB-DU3) of IAB-node 3 is F1-terminated at CU1, and one of parent nodes of IAB-node 3, namely, DU of IAB-node 2 (IAB-DU2) is F1-terminated at CU2. A descendant IAB-node of IAB-node 3 refers to a node that is connected to the network via the boundary IAB-node, and each node is single-connected to its own parent node. For example, IAB-node 4 is a descendant IAB-node of IAB-node 3, and its parent node (IAB-node 3) is simultaneously connected to donor-CU1 and donor-CU2.

An F1-terminating node refers to a donor-CU that terminates an F1 interface of a boundary IAB-node or a descendant node, such as donor-CU1. As shown in FIG. 5, both IAB-DU3 and IAB-DU4 are F1 terminated at donor-CU1.

A non-F1-terminating node refers to a CU with a function of a donor that does not terminate an F1 interface of a boundary IAB-node or a descendant node, such as donor-CU2.

Additionally, FIG. 5 is an exemplary structure of this scenario only, which there may also exist other IAB-nodes. For example, there may exist multiple nodes for multi-hop connection between IAB-node 3 and IAB-node 4.

In the embodiments this disclosure, a main purpose of the topology redundancy is to enable load balancing of services. If a donor-CU has excessive traffics under the topology managed by itself, some of its traffics may be offloaded to a topology network managed by another donor-CU, i.e. data transmission is performed via a redundant path. When traffic offloading is needed, the F1-terminating donor initiates traffic offloading to other donors; the F1 interfaces of the boundary IAB-node and its descendant nodes are terminated to the same donor; for an IAB-MT dual-connected to two IAB donors, load balancing based on each F1-U tunnel should be supported; and in implementing inter-donor topology redundancy, for F1-C traffics, the granularity of load balancing is per TNL (transport network layer) association.

In addition, R17 supports inter-donor radio link failure (RLF) recovery and migration, meaning that a source parent node and a destination parent node are served by different IAB-donor-CUs.

In a scenario of partial migration, the IAB-MT of the boundary IAB-node has already been migrated to a second IAB-donor-CU, while the IAB-DU of the boundary IAB-node is still F1-terminated to a first IAB-donor-CU. In addition, if the boundary IAB-node has a descendant IAB-node, its descendant IAB-node is also F1-terminated to the first IAB-donor-CU.

Figure 6:
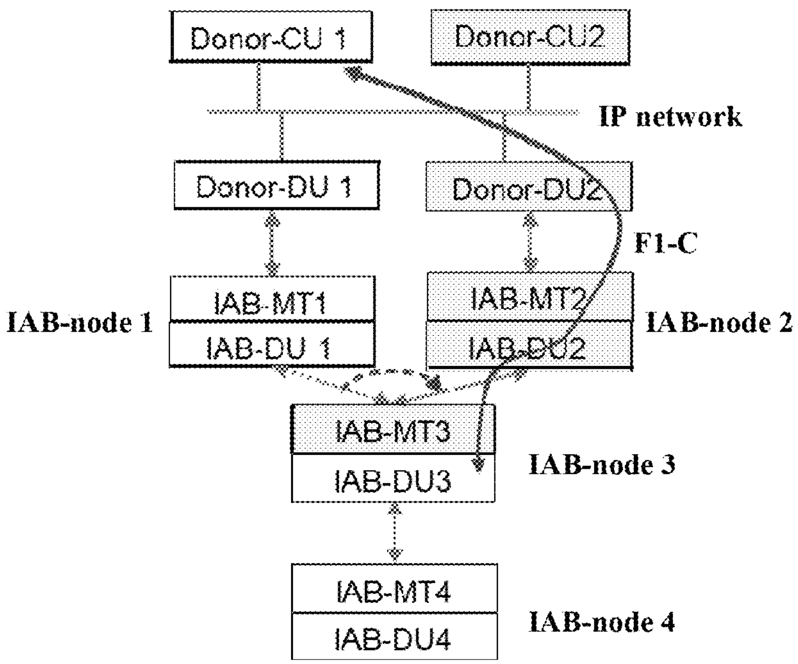
FIG. 6 is a schematic diagram of application scenario 2 as an example of the embodiment of this disclosure.

FIG. 6 is a schematic diagram of application scenario 2 as an example of the embodiment of this disclosure. As shown in FIG. 6, it is a scenario of partial migration.

As shown in FIG. 6, IAB-node 3 is a boundary IAB-node, which is a migrating node. IAB-MT3 of IAB-node 3 is changed from being single-connected to a parent node (IAB-node 1) to being single-connected to another parent node (IAB-node 2). Both IAB-DU3 of IAB-node 3 and descendant IAB-node 4 of IAB-node 3 are still F1-connected to donor-CU1, but a path through which the F1 connection passes finally reaches CU1 through IAB-node 2.

Existing BAP routing is managed and configured by a donor-CU of local topology. A BAP address of each IAB-node is configured by A donor-CU managing the IAB-node via RRC signaling. In a scenario of inter-donor topology redundancy, the boundary IAB-node may have a BAP address in each topology.

For example, in the scenario shown in FIG. 5, BAP addresses of IAB-node 1, IAB-node 4 and donor-DU1 are configured by donor-CU1, and they constitute a first topology; BAP addresses of IAB-node 2 and donor-DU2 are configured by donor-CU2, and they constitute a second topology. Boundary IAB-node 3, i.e. IAB-node 3, belongs to two topologies. IAB-node 3 may be configured with a BAP address respectively by donor-CU1 and donor-CU2, and the two addresses may be identical or different. As allocation of BAP addresses by different donor-CUs is independent and with no negotiation process, the BAP addresses in the two topologies may be identical, that is, BAP address conflicts may occur. In cross-topology transmission, BAP address conflicts in certain scenarios may possibly lead to routing ambiguities.

For example, the two parent nodes, IAB-node 1 and IAB-node 2, of IAB-node 3, i.e. the boundary IAB-node, belong respectively to a first topology and a second topology, and BAP addresses of IAB-node 1 and IAB-node 2 may possibly be identical. In the case where the BAP addresses of IAB-node 1 and IAB-node 2 are identical, when IAB-node 3 receives upstream BAP packets (also referred to as uplink data, i.e. data received by the IAB-DU from its descendant node) and the packets need to be routed, a next hop of BAP address to which one or more BAP routing identifiers in a routing table correspond(s) may not be definitely specified. Hence, the next hop of BAP address in the routing table does not know which node in IAB-node 1 and IAB-node 2 is referred to, resulting in routing ambiguities.

In addition, as IAB-node 3 serving as the boundary IAB-node may pass through different topologies in the upstream direction, routing identifiers used by the two topologies may be identical, that is, there may exist two entries in the routing table of IAB-node 3 that contain identical routing identifiers. Likewise, a routing identifier in the upstream direction leading to a second path and a routing identifier in a downstream direction may also be identical. In looking up the routing table after IAB-node 3 receives a BAP packet, there may occur a case where routing identifiers in the routing table are not unique, causing that a next hop of node is unable to be determine, thereby resulting in routing ambiguities.

In addition, for the scenarios in FIGS. 5 and 6, the first topology and the second topology are independently assigned with BAP addresses, hence, conflicts may occur between the BAP addresses of the two topologies. For example, the BAP addresses of IAB-node 2 and IAB-node 4 may be identical. Both IAB-node 2 and IAB-node 4 are neighboring nodes of IAB-node 3, and BAP addresses thereof may appear in "next hop BAP addresses" in the routing table of IAB-node 3. If a next hop of BAP address to which a certain routing identifier corresponds is the BAP address, an egress link to which the BAP packet is transmitted is unknown, thereby leading to routing ambiguities.

Moreover, in the scenario of partial migration shown in FIG. 6, IAB-MT3 has been migrated to the topology of donor-CU2, and has been configured with a BAP address by donor-CU2 via an RRC message. However, as IAB-DU3 is still managed by donor-CU1, the BAP address of IAB-node 3 before migration, i.e. the BAP address allocated by donor-CU1 via RRC, is actually saved by donor-CU1. In the topology managed by donor-CU1, all BAP addresses corresponding to IAB-node 3 in the routing table are old BAP addresses of IAB-node 3, and a BAP address of the parent node IAB-node 3 saved by the descendant node of IAB-node 3 is also an old BAP address, which will bring uncertainty to configuration of BAP addresses. For example, a new IAB-node 5 (not shown in FIG. 6) is connected to IAB-node 3 and becomes a descendant node of IAB-node 3, and the descendant node needs to be configured (saved) with the BAP address of the parent node, hence, which BAP address of IAB-node 3 needs to be used will cause uncertainty. That is, there exists a problem of ambiguity in the use of multiple BAP addresses of the boundary IAB-node.

Furthermore, according to an existing mechanism, once a BAP address is configured for a BAP entity of an IAB-node, the BAP address cannot be changed.

In addition, in the scenarios shown in FIGS. 5 and 6, a radio link failure (RLF) may occur in a link to which the boundary IAB-node is connected.

For example, in the scenario of inter-donor topology redundancy shown in FIG. 5, a radio link failure (RLF) may possibly occur in a link of a parent node of the boundary IAB-node. For example, a radio link failure occurs in a link of a parent node of the second path shown in FIG. 5, i.e. a link between IAB-node 3 and IAB-node 2.

Figure 7:
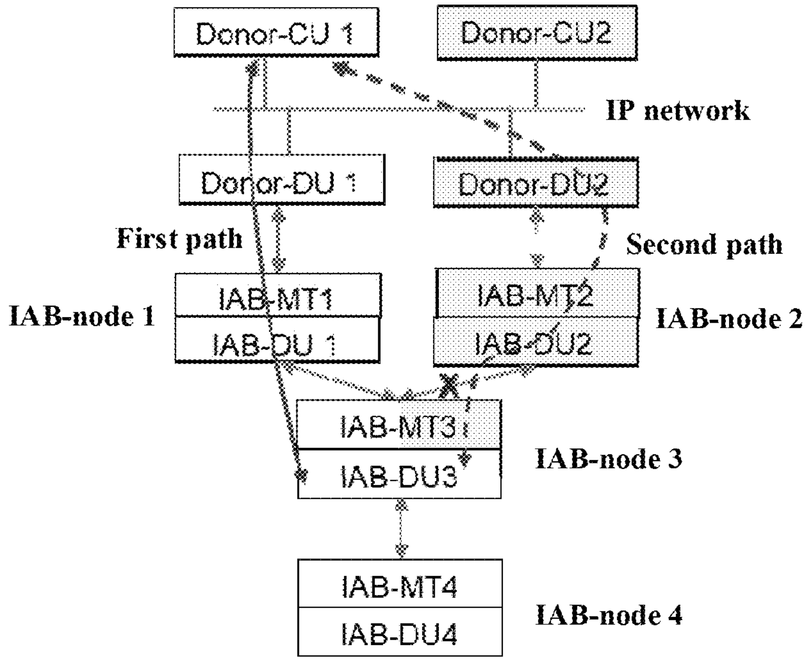
FIG. 7 is a schematic diagram of a radio link failure occurred in application scenario 1.

FIG. 7 is a schematic diagram of a radio link failure occurred in application scenario 1 in the embodiment of this disclosure. As shown in FIG. 7, a radio link failure occurs in the link between IAB-node 3 and IAB-node 2.

In the scenario of partial migration shown in FIG. 6, after a period of time of partial migration, a radio link failure may possibly occur in the boundary IAB-node. For example, in FIG. 6, a radio link failure occurs in the link between IAB-node 3 and IAB-node 2, i.e. interruption occurs. IAB-node 3 may possibly perform RLF recovery, so as to be recovered to an original parent node, i.e. IAB-node 1, so that both IAB-node 3 and its descendant node are recovered to the scenario before partial migration, i.e. revoking of the partial migration, which may also be understood as one more migration.

Figure 8:
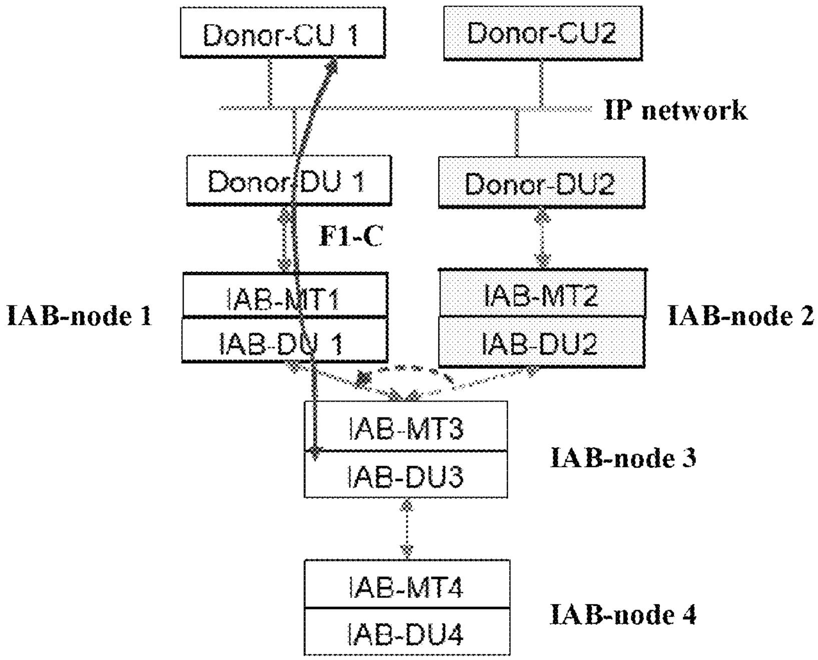
FIG. 8 is a schematic diagram of partial migration revoking occurred in application scenario 2.

FIG. 8 is a schematic diagram of partial migration revoking occurred in application scenario 2 the embodiment this disclosure. As shown in FIG. 8, IAB-node 3 and its descendant node (IAB-node 4) have been changed back to the scenario before partial migration, that is, revoking of partial migration has occurred.

As to the cases where radio link failures occur in the link to the boundary IAB-node is connected shown in FIGS. 7 and 8, there exists currently no effective routing mechanism.

In order to solve one or more of the above problems, various implementations of the embodiments of this disclosure shall be described below with reference to the accompanying drawings. These implementations are illustrative only and are not intended to limit this disclosure.

Embodiment 1

The embodiment of this disclosure provides a wireless routing method, applicable to a first IAB-node.

In the embodiment of this disclosure, an IAB-DU of the first IAB-node and a parent node of the first IAB-node are F1-terminated to different IAB-donor-CUs. For example, the first IAB-node is referred to as a boundary IAB-node.

For example, the first IAB-node is IAB-node 3 in FIG. 5.

Figure 9:
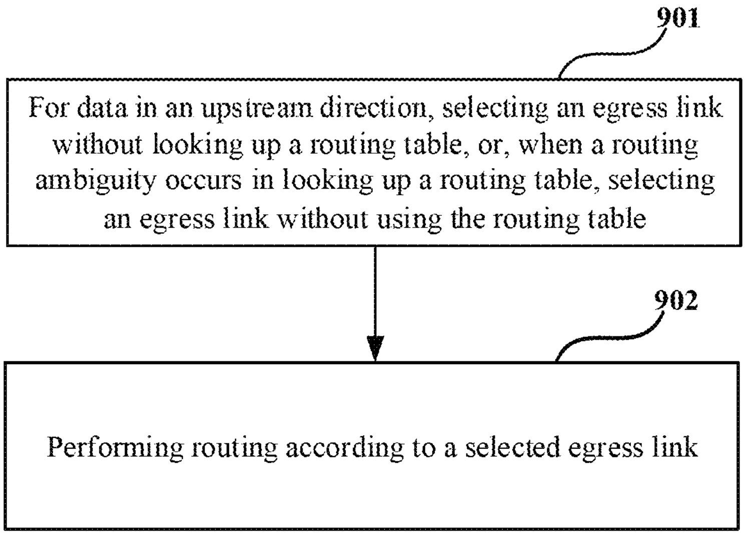
FIG. 9 is a schematic diagram of the wireless routing method of embodiment 1 of this disclosure.

FIG. 9 is a schematic diagram of the wireless routing method of embodiment 1 of this disclosure. As shown in FIG. 9, the method includes:

step 901: for data in an upstream direction, selecting an egress link without looking up a routing table, or, when a routing ambiguity occurs in looking up a routing table, selecting an egress link without using the routing table; and step 902: performing routing according to a selected egress link.

Hence, for the data in the upstream direction, the first IAB-node selects the egress link without looking up a routing table, or, when a routing ambiguity occurs in looking up a routing table, selects the egress link without using the routing table and performs routing, thereby avoiding routing ambiguities resulted from BAP address conflicts or routing identifier conflicts.

For example, in the scenario shown in FIG. 5, even if BAP addresses of IAB-node 1 and IAB-node 2 are identical, or if there exist two entries containing identical routing identifiers in the routing table of IAB-node 3, or even if routing identifiers in the upstream direction leading to the second path are identical to routing identifiers in a downstream direction, as IAB-node 3 directly selects the egress link for routing without looking up the routing table, routing ambiguities resulted from BAP address conflicts or routing identifier conflicts may be avoided.

In the embodiment of this disclosure, for example, the data in the upstream direction include BAP packets.

In step 901, for the data in the upstream direction, the first IAB-node selects the egress link without looking up the routing table, that is, the first IAB-node performs routing by directly selecting the egress link without needing to configure a routing entry in the upstream direction.

Or, in step 901, the egress link may also be selected when a routing ambiguity occurs in looking up the routing table. For example, when duplicate routing IDs occur and the next hop BAP address corresponds to two parent nodes, the routing table is not used to select an egress link. A method for selecting an egress link by the first IAB-node in step 901 shall be described below in detail.

In step 901, the egress link may be selected by looking up a first BAP header rewriting table. For example, whether the first BAP header rewriting table contains an entry of a routing identifier in a BAP header of the BAP packet in the upstream direction may be determined by looking up the first BAP header rewriting table, thereby selecting the egress link.

For example, after a receiving part of a BAP entity of a first IAB-node-DU receives a BAP packet and transmit the BAP packet to a transmitting part of a collocated BAP entity (a BAP entity of an IAB-MT), whether the first BAP header rewriting table contains an entry of a routing identifier in a BAP header of the BAP packet in the upstream direction is determined by looking up the first BAP header rewriting table.

In the embodiment of this disclosure, the first BAP header rewriting table may be referred to as first header rewriting configuration, and may also be referred to as first routing identifier mapping configuration, which includes a mapping relationship between a previous routing ID and a new routing ID. The first BAP header rewriting table is used by the first IAB-node to rewrite the routing ID of the BAP header.

In the embodiment of this disclosure, the previous routing ID may also be referred to as an ingress routing ID or a rewritten routing ID, which indicates a BAP routing ID needing to be rewritten or replaced. The new routing ID may also be referred to as an egress routing ID.

The first BAP header rewriting table is used for inter-topology transmission, applicable to a topology redundancy case where the first IAB-node is in dual connectivity and a case where the first IAB-node is in single connectivity of partial migration, and may be divided into upstream and downstream BAP header rewriting. When the first BAP header rewriting table is about upstream BAP header rewriting configuration, the new routing ID corresponds to a routing ID of the second path in FIG. 5.

In the embodiment of this disclosure, the first BAP header rewriting table may be configured by the IAB-donor-CU managing the DU of the first IAB-node. For example, in the scenario shown in FIG. 5, the first BAP header rewriting table in IAB-node 3 is configured by donor-CU1.

FIG. 10 is a schematic diagram of a method for implementing step 901 of embodiment 1 of this disclosure. As shown in FIG. 10, the method includes:

step 1001: when the routing ID in the BAP header of the BAP packet is identical to a previous routing ID in an entry of the first BAP header rewriting table, selecting an egress link corresponding to a parent node F1-terminated to an IAB-donor-CU different from an IAB-donor-CU to which the first IAB-node is F1-terminated;

and/or, step 1002: when the routing ID in the BAP header of the BAP packet is different from previous routing IDs in all entries of the first BAP header rewriting table, selecting an egress link corresponding to a parent node F1-terminated to an IAB-donor-CU identical to an IAB-donor-CU to which the first IAB-node is F1-terminated.

In the embodiment of this disclosure, the selected egress link is available, and when the selected egress link is not available, it may be processed according to existing techniques, such as rerouting, etc.

For example, when the routing ID in the BAP header of the BAP packet is identical to the previous routing ID in the entry of the first BAP header rewriting table, an egress link corresponding to the parent node in FIG. 5, i.e. AB-node 2, F1-terminated to an IAB-donor-CU different from an IAB-donor-CU to which IAB-DU3 is F1-terminated, is selected, that is, the BAP packet needs to be transmitted to a second path; and when the routing ID in the BAP header of the BAP packet is different from previous routing IDs in all entries of the first BAP header rewriting table, an egress link corresponding to the parent node in FIG. 5, i.e. AB-node 1, F1-terminated to an IAB-donor-CU identical to an IAB-donor-CU to which IAB-DU3 is F1-terminated, is selected, that is, the BAP packet needs to be transmitted to a first path.

In the embodiment of this disclosure, whether a parent node and the first IAB-node DU are F1-terminated to the same IAB-donor-CU is determined, that is, whether the parent node and the first IAB-node belong to the same topology is determined. In the scenario of inter-donor topology redundancy, the F1-terminating node may possibly be a master node (MN), or may possibly be a secondary node (SN). Hence, an MCG (master cell group) may correspond to the first path, or may correspond to the second path. Likewise, an SCG (secondary cell group) may correspond to the first path, or may correspond to the second path. A specific method of determination shall be illustrated below.

A bap-Config IE in RRCReconfiguration (an RRC reconfiguration message) has optional fields defaultUL-BAP-RoutingID and defaultUL-BH-RLC-Channel used for configuring default uplink paths, which are used by the IAB-node to perform routing on F1-C and non-F1 traffics and select BH RLC channels in a process of bootstrapping, migration, RRC recovery of an IAB-MT and RRC reconstruction of the IAB-MT. The two fields are necessary only in the process of bootstrapping of the IAB-node. According to the RRC reconfiguration message containing the two field received at a recent time, which cell group (or parent node link) corresponds to an F1-termination donor and which cell group corresponds to a non-F1-termination donor may be determined.

FIG. 11 is a schematic diagram of a method for determining whether the parent node and the first IAB-node are F1-terminated to the same IAB-donor-CU of embodiment 1 of this disclosure. As shown in FIG. 11, the method includes:

step 1101: when a last RRC reconfiguration message received by the first IAB-node that contains at least one of a defaultUL-BAP-RoutingID and a defaultUL-BAP-BH-RLC-Channel comes from a parent node, a F1-termination donor of the parent node is identical to that of the first IAB-node-DU, and a F1-termination donor of another parent node of the first IAB is different from that of the first IAB-node, that is, the F1-termination donor of the other parent node is a non-F1-termination donor of the first IAB-node, at least one of the defaultUL-BAP-RoutingID and defaultUL-BAP-BH-RLC-Channel being included in a first BAP configuration IE (bap-Config IE) in the RRC reconfiguration message.

When the first IAB-node receives the most recent RRC reconfiguration message containing at least one of the defaultUL-BAP-RoutingID and defaultUL-BAP-BH-RLC-Channel from a parent node, the parent node and the F1 terminating host of the first IAB-node DU are identical, but the other parent node of the first IAB-node and the F1 terminating host of the first IAB-node are different, that is, the F1 terminating host of the other parent node is the non F1 terminating host of the first IAB-node, and the defaultUL-BAP-RoutingID and at least one of the defaultUL-BAP-BH-RLC-Channel are included in the first IAB-node. The first BAP configuration IE (bap config IE) in the RRC reconfiguration message.

Figure 12:
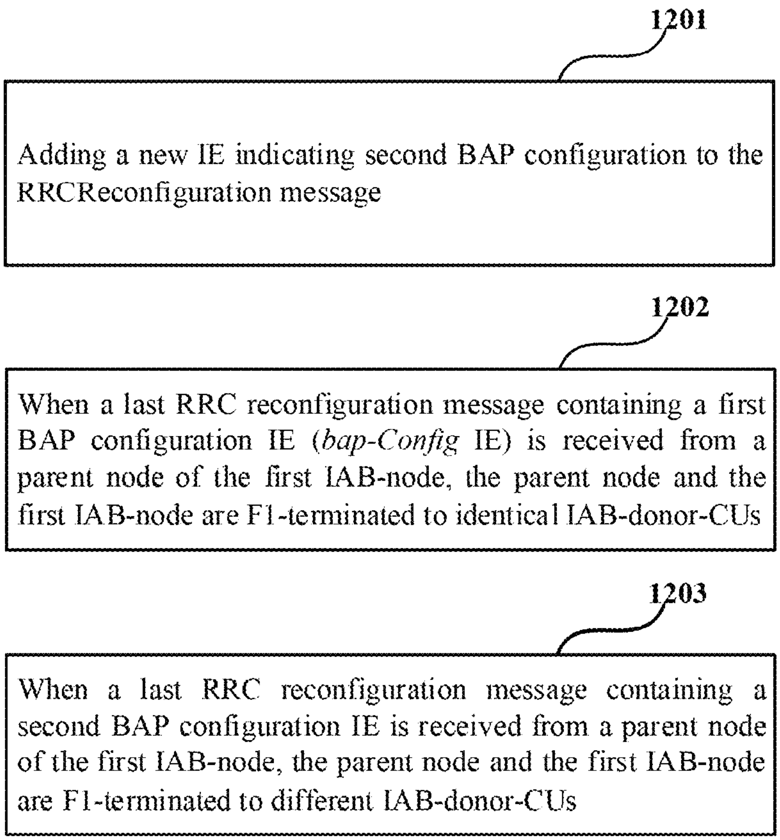
FIG. 12 is a schematic diagram of another method for determining whether a parent node and a first IAB-node are F1-terminated to the same IAB-donor-CU of embodiment 1 of this disclosure.

FIG. 12 is a schematic diagram of another method for determining whether the parent node and the first IAB-node are F1-terminated to the same IAB-donor-CU of embodiment 1 of this disclosure. As shown in FIG. 12, the method includes:

step 1201: adding a new IE, such as being referred to as secondary-bap-Config, indicating second BAP configuration, to the RRCReconfiguration message, field therein being identical to the existing bap-Config, indicating that the configuration is from the non-F1-termination donor-CU.

This method further includes:

step 1202: when a last RRC reconfiguration message containing a first BAP configuration IE (bap-Config IE) is received from a parent node of the first IAB-node, the parent node and the first IAB-node are F1-terminated to identical IAB-donor-CUs; and/or, step 1203: when a last RRC reconfiguration message containing a second BAP configuration IE is received from a parent node of the first IAB-node, the parent node and the first IAB-node are F1-terminated to different IAB-donor-CUs.

The method shown in FIG. 9 may be used in, for example, a case where the first IAB-node is in dual connectivity and no radio link failure occurs in the link between the first IAB-node and its parent node. A case where the first IAB-node is in dual connectivity and a radio link failure occurs in a link between the first IAB-node and its parent node.

Figure 13:
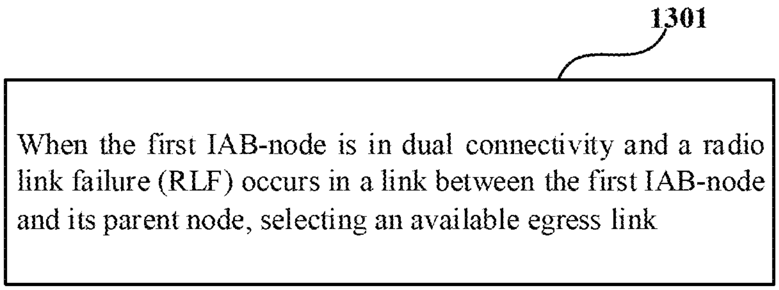
FIG. 13 is another schematic diagram of the wireless routing method of embodiment 1 of this disclosure.

FIG. 13 is another schematic diagram of the wireless routing method of embodiment 1 of this disclosure. As shown in FIG. 13, the method includes:

step 1301: when the first IAB-node is in dual connectivity and a radio link failure (RLF) occurs in a link between the first IAB-node and its parent node, selecting an available egress link.

For example, for the scenario shown in FIG. 7, if a radio link failure occurs in a link between IAB-node 3 and a parent node, i.e. IAB-node 2, an available egress link, i.e. egress link to which another parent node (IAB-node 1) corresponds, is selected.

For another example, for the scenario shown in FIG. 8, a radio link failure occurs in a link between IAB-node 3 and IAB-node 2, that is, interruption occurs. IAB-node 3 performs RLF recovery for being recovered to an original parent node, i.e. IAB-node 1, and an available egress link, i.e. an egress link to which IAB-node 1 corresponds, is selected.

Hence, an effective routing mechanism is provided for the case where a radio link failure occurs in the link to which the boundary IAB-node is connected.

In addition, in the case where a radio link failure occurs in the link to which the boundary IAB-node is connected, BAP header rewriting is performed according to the second BAP header rewriting table.

For example, as shown in FIG. 7, in the case where a radio link failure occurs in the parent node link of the second path, the second path is unavailable, and the boundary IAB-node should reroute the BAP packet originally needing to be routed via the second path to the first path. However, the routing ID contained in the BAP header of the BAP data received by the boundary IAB-node still leads to donor-DU2, and BAP header rewriting needs to be performed in the boundary IAB-node. At this moment, the BAP header rewriting is to rewrite the BAP routing ID of the BAP header leading to donor-DU2 to a BAP routing ID leading to donor-DU1, and this new BAP routing ID is in the topology managed by CU1. At this point, it corresponds to the second BAP header rewriting table.

For example, as shown in FIG. 8, during the process of partial migration revoking, donor-CU1 requires a time process to configure the boundary IAB-node (IAB-node 3) and its descendant node (IAB-node 4). During this process, the upstream data of the descendant node may possibly still use the original routing configuration, or there may exist on-the-fly data (data during transmission). Thus, the routing ID contained in the BAP header of the BAP data received at the boundary IAB-node still leads to donor-DU2, that is, it is before RLF recovery, and BAP header rewritten needs to be performed at the boundary IAB-node. At this moment, the BAP header rewriting is to rewrite the BAP routing ID of the BAP header leading to donor-DU2 to the BAP routing ID of donor-DU1, and this new BAP routing ID is in the topology managed by CU1. At this point, it corresponds to the second BAP header rewriting table.

In the embodiment of this disclosure, the second BAP header rewriting table is also referred to as second header rewriting configuration, and is used for a case where an RLF occurs in a boundary nodes or a case of migration. In addition, the second header rewriting configuration may also be referred to as header rewriting configuration for inter-donor-DU re-routing, which only applies to uplink data.

In the embodiment of this disclosure, the first BAP header rewriting table and the second BAP header rewriting table are configured as two separate tables, or configured as separate two parts of entries in one table. Hence, uncertainty of routing selection caused by two identical "previous routing IDs" corresponding to different "new routing IDs" may be avoided.

In the embodiment of this disclosure, when the first IAB-node is configured with the BAP header rewriting table, whether BAP header rewriting is performed needs to be determined.

Figure 14:
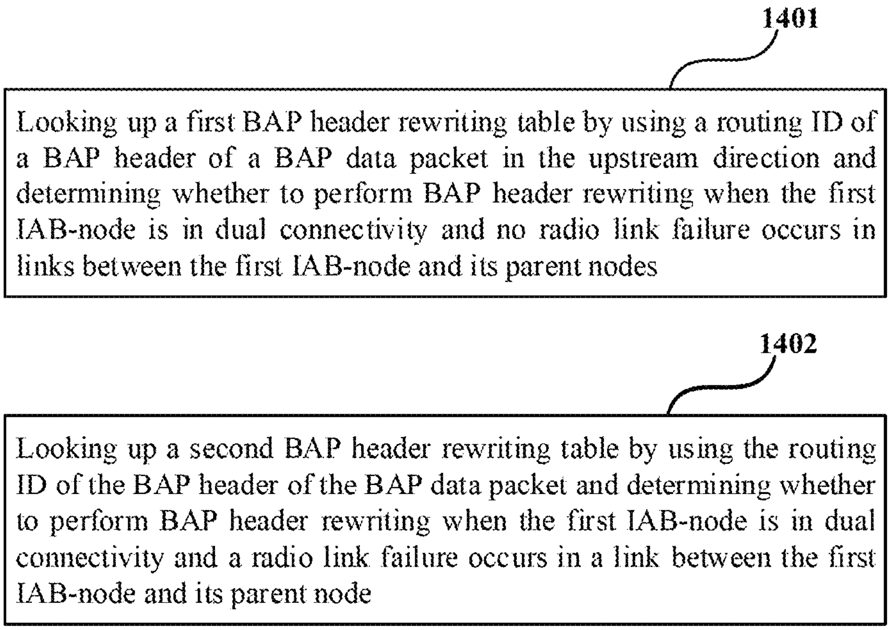
FIG. 14 is a schematic diagram of a method for rewriting by using a BAP header rewriting table of embodiment 1 of this disclosure.

FIG. 14 is a schematic diagram of a method for rewriting by using a BAP header rewriting table of embodiment 1 of this disclosure. As shown in FIG. 14, the method includes:

step 1401: looking up a first BAP header rewriting table by using a routing ID of a BAP header of a BAP data packet in the upstream direction and determining whether to perform BAP header rewriting when the first IAB-node is in dual connectivity and no radio link failure occurs in links between the first IAB-node and its parent nodes; and/or, step 1402: looking up a second BAP header rewriting table by using the routing ID of the BAP header of the BAP data packet and determining whether to perform BAP header rewriting when the first IAB-node is in dual connectivity and a radio link failure occurs in a link between the first IAB-node and its parent node.

For the case where the first IAB-node is in dual or single connectivity, the following method may be used to determine whether to perform BAP header rewriting. In the case the first BAP header rewriting table is configured, the first BAP header rewriting table is looked up first by using the routing ID in the BAP header of the BAP packet, and when a matching new routing ID is found and a corresponding egress link is available, BAP header rewriting is performed according to the first BAP header rewriting table; and when no matching new routing ID is found or when a matching new routing ID is found but a corresponding egress link is unavailable, the second BAP header table is looked up and whether to perform BAP header rewriting is determined.

For the case where the first IAB-node is in dual or single connection, the following method may be used to determine whether to perform BAP header rewriting. As the second BAP header table is usually for situations where RLFs occur, rerouting needs to be performed in a temporary period of time. Once configuration of descendant nodes is completed and the on-the-fly data are transmitted, the donor-CU may release or delete the second BAP header table of the first IAB-node. Therefore, it may be deemed that the second BAP header rewriting table has a higher priority. In a case where the first BAP header rewriting table and the second BAP header rewriting table are configured, whether BAP header rewriting is performed is determined according to the second BAP header rewriting table. It may also be said that as long as the second BAP header rewriting table is configured, BAP header rewriting will be performed according to the second BAP header rewriting table.

In step 1401 or step 1402, when the routing ID in the BAP header of the BAP packet is identical to a previous routing ID in an entry of the retrieved BAP header rewriting table, BAP header rewriting needs to be performed; and when the routing ID in the BAP header of the BAP packet is different from previous routing IDs in all entries of the retrieved BAP header rewriting table, BAP header rewriting needs not to be performed. In the embodiment of this disclosure, after step 1401 or step 1402, i.e. after BAP header rewriting is performed, the action of selecting the egress link in step 901 or step 1301 may be performed.

Figure 15:
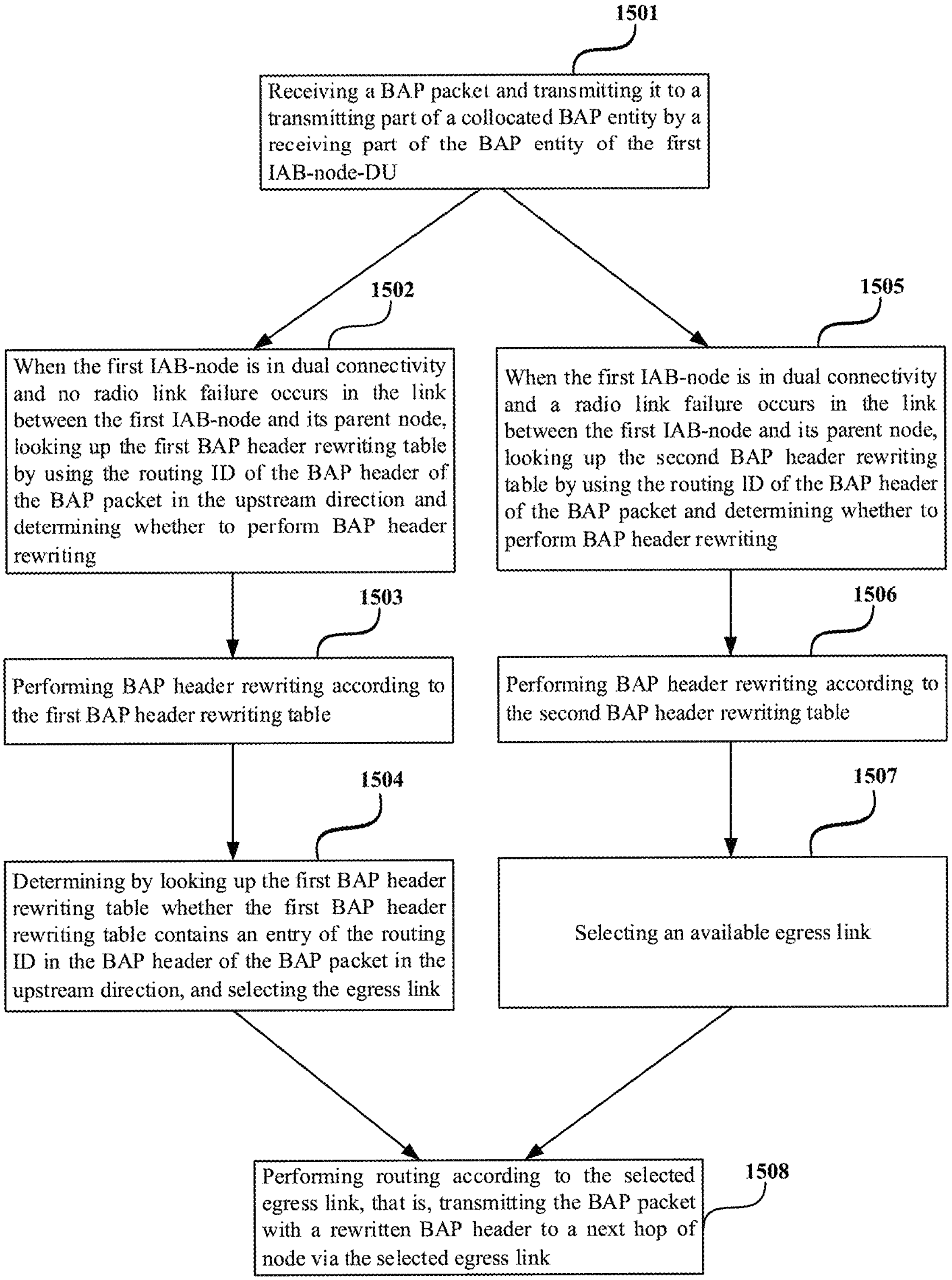
FIG. 15 is a schematic diagram of implementing the wireless routing method of embodiment 1 of this disclosure.

FIG. 15 is a schematic diagram of implementing the wireless routing method of embodiment 1 of this disclosure. As shown in FIG. 15, the method includes:

step 1501: receiving a BAP packet and transmitting it to a transmitting part of a collocated BAP entity by a receiving part of the BAP entity of the first IAB-node-DU;

step 1502: when the first IAB-node is in dual connectivity and no radio link failure occurs in the link between the first IAB-node and its parent node, looking up the first BAP header rewriting table by using the routing ID of the BAP header of the BAP packet in the upstream direction and determining whether to perform BAP header rewriting;

step 1503: performing BAP header rewriting according to the first BAP header rewriting table;

step 1504: determining by looking up the first BAP header rewriting table whether the first BAP header rewriting table contains an entry of the routing ID in the BAP header of the BAP packet in the upstream direction, and selecting the egress link;

step 1505: when the first IAB-node is in dual connectivity and a radio link failure occurs in the link between the first IAB-node and its parent node, looking up the second BAP header rewriting table by using the routing ID of the BAP header of the BAP packet and determining whether to perform BAP header rewriting;

step 1506: performing BAP header rewriting according to the second BAP header rewriting table;

step 1507: selecting an available egress link; and step 1508: performing routing according to the selected egress link, that is, transmitting the BAP packet with a rewritten BAP header to a next hop of node via the selected egress link.

In the embodiment of this disclosure, the MT and DU of the first IAB-node may be configured with BAP addresses respectively. That is, the first IAB-donor-CU configures a BAP address for the DU of the first IAB-node, and the second IAB-donor-CU configures a BAP address for the MT of the first IAB-node.

For example, the BAP address of the first IAB-node-DU is used to manage a process of configuring a node of the first topology by the first IAB-donor-CU of the first IAB-node.

For example, the configuring a node of the first topology by the first IAB-donor-CU includes at least one of routing table configuration, BH RLC channel configuration and mapping, and UE context configuration.

For example, in a case where a cell of the first IAB-node DU is selected as a serving cell when the second IAB-node performs cell selection, the first IAB-donor-CU managing the first IAB-node performs cell group configuration (CellGroupConfig) on the second IAB-node via an RRC reconfiguration message, a BAP address in the cell group configuration representing a BAP address of a parent node DU belonging to the cell group.

Hence, a problem of ambiguity in the use of multiple BAP addresses of the boundary IAB-node may be solved.

For example, in the scenario shown in FIG. 6, in cell selection, a new IAB-node 5 (not shown in FIG. 6) selects a cell of IAB-DU3 as a serving cell, and the serving cell is connected to IAB-node 3. IAB-donor-CU1 performs cell group configuration (CellGroupConfig) on IAB-node 5 via RRCReconfiguration, bap-Address in CellGroupConfig representing the BAP address of the parent node DU belonging to the cell group. It can also be said that bap-Address in CellGroupConfig represents a BAP address saved by the parent node belonging to the cell group in its F1-terminating CU.

For a non-boundary IAB-node, an IAB-MT and an IAB-DU may use identical BAP addresses. In addition, when the non-boundary IAB-node becomes a boundary IAB-node, BAP addresses may be configured for its IAB-MT and IAB-DU respectively.

In the embodiment of this disclosure, after configuring the BAP address for the BAP entity of the IAB-node, the BAP address is not changed under the management of the same IAB-donor-CU. In addition, when the IAB-donor-CU managing the IAB-node changes or adds a new IAB-donor, a CU of the changed or added IAB-donor reconfigures the BAP address of the BAP entity of the IAB-node. Thus, the problem that the BAP address cannot be changed in existing mechanisms may be solved.

It can be seen from the above embodiment that for the data in the upstream direction, the first IAB-node selects the egress link without looking up a routing table, or, when a routing ambiguity occurs in looking up a routing table, selects the egress link without using the routing table and performs routing, thereby avoiding routing ambiguities resulted from BAP address conflicts or routing identifier conflicts.

Embodiment 2

The embodiment of this disclosure provides a wireless routing method, applicable to a first IAB-node. An IAB-DU of the first IAB-node and a parent node of the first IAB-node are F1-terminated to different IAB-donor-CUs. For example, the first IAB-node is referred to as a boundary IAB-node.

For example, the first IAB-node is IAB-node 3 in FIG. 5 and FIG. 6.

Figure 16:
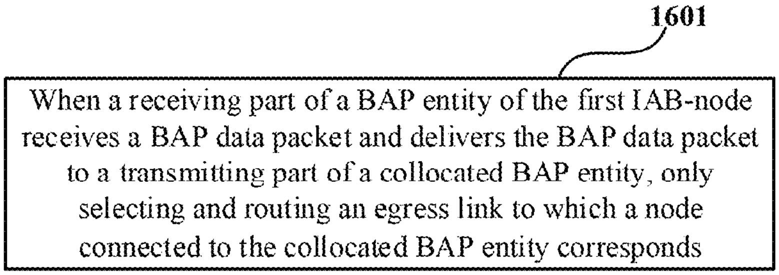
FIG. 16 is a schematic diagram of the wireless routing method of embodiment 2 of this disclosure.

FIG. 16 is a schematic diagram of the wireless routing method of embodiment 2 of this disclosure. As shown in FIG. 16, the method includes:

step 1601: when a receiving part of a BAP entity of the first IAB-node receives a BAP data packet and delivers the BAP data packet to a transmitting part of a collocated BAP entity, only selecting and routing an egress link to which a node connected to the collocated BAP entity corresponds.

Hence, a problem of possible conflicts of uplink and downlink routing IDs in a routing table may be solved.

For example, in step 1601, after the receiving part of the BAP entity of the first IAB-node receives the BAP data packet and delivers the BAP data packet to the transmitting part of the collocated BAP entity, when a BAP address of a next hop corresponding to a routing ID of a BAP header is obtained by looking up a routing table and BAP addresses of two neighboring nodes of the first IAB-node are both identical to the BAP address of the next hop, an egress link corresponding to a node in the two neighboring nodes connected to the collocated BAP entity is selected and routed.

Thus, for the scenarios in FIG. 5 and FIG. 6, a first topology and a second topology are independently assigned with BAP addresses, and there may appear conflicts between the BAP addresses of the two topologies. For example, BAP addresses of IAB-node 2 and IAB-node 4 may possibly be identical. IAB-node 2 and IAB-node 4 are both neighboring nodes of IAB-node 3, and their BAP addresses may be present in the same "next hop BAP address" field in a routing table of IAB-node 3. If a next hop BAP address to which a routing ID corresponds is the identical BAP address, an egress link to which the BAP packet is transmitted is unknown, thereby leading to routing ambiguities. With step 1601, the egress link corresponding to the node in the two neighboring nodes connected to the collocated BAP entity is selected and routed, and the problem of routing ambiguities is solved.

Embodiment 3

The embodiment of this disclosure provides a method for configuring a BAP address, applicable to an IAB-donor.

Figure 17:
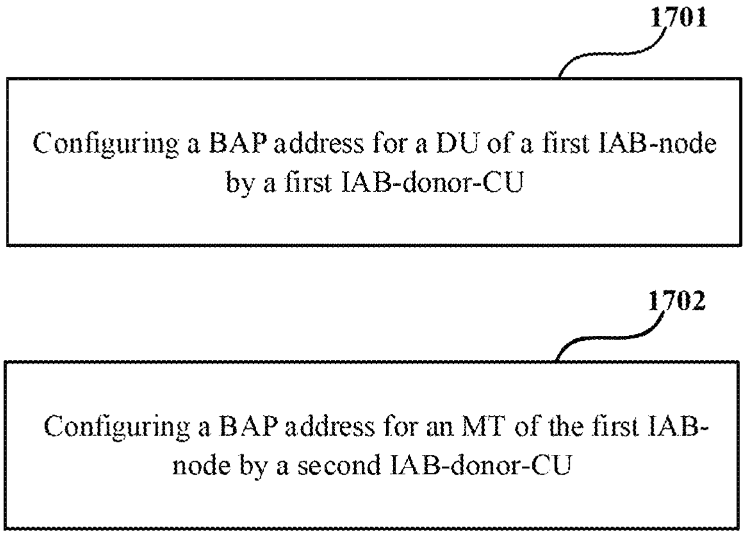
FIG. 17 is a schematic diagram of the method for configuring a BAP address of embodiment 3 of this disclosure.

FIG. 17 is a schematic diagram of the method for configuring a BAP address of embodiment 3 of this disclosure. As shown in FIG. 17, the method includes:

step 1701: configuring a BAP address for a DU of a first IAB-node by a first IAB-donor-CU; and step 1702: configuring a BAP address for an MT of the first IAB-node by a second IAB-donor-CU.

For example, the BAP address of the first IAB-node-DU is used to manage a process of configuring a node of the first topology by the first IAB-donor-CU of the first IAB-node.

For example, the configuring a node of the first topology by the first IAB-donor-CU includes at least one of routing table configuration, BH RLC channel configuration and mapping, and UE context configuration.

For example, in a case where a cell of the first IAB-node DU is selected as a serving cell when the second IAB-node performs cell selection, the first IAB-donor-CU managing the first IAB-node performs cell group configuration (CellGroupConfig) on the second IAB-node via an RRC reconfiguration message, a BAP address (bap-Address) in the cell group configuration representing a BAP address of a parent node DU belonging to the cell group.

For example, in the scenario shown in FIG. 6, in cell selection, a new IAB-node 5 (not shown in FIG. 6) selects a cell of IAB-DU3 as a serving cell, and the serving cell is connected to IAB-node 3. IAB-donor-CU1 performs cell group configuration (CellGroupConfig) on IAB-node 5 via RRCReconfiguration, bap-Address in CellGroupConfig representing the BAP address of the parent node DU belonging to the cell group. It can also be said that bap-Address in CellGroupConfig represents a BAP address saved by the parent node belonging to the cell group in its F1-termination CU.

Hence, a problem of ambiguity in the use of multiple BAP addresses of the boundary IAB-node may be solved.

Embodiment 4

The embodiment of this disclosure provides a method for configuring a BAP address, applicable to an IAB-donor.

Figure 18:
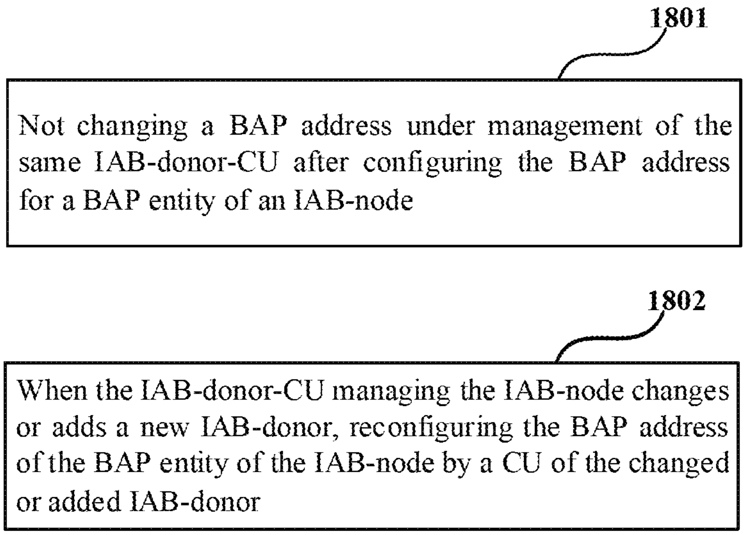
FIG. 18 is a schematic diagram of the method for configuring a BAP address of embodiment 4 of this disclosure.

FIG. 18 is a schematic diagram of the method for configuring a BAP address of embodiment 4 of this disclosure. As shown in FIG. 18, the method includes:

step 1801: not changing a BAP address under management of the same IAB-donor-CU after configuring the BAP address for a BAP entity of an IAB-node.

As shown in FIG. 18, the method may further include:

step 1802: when the IAB-donor-CU managing the IAB-node changes or adds a new IAB-donor, reconfiguring the BAP address of the BAP entity of the IAB-node by a CU of the changed or added IAB-donor.

Hence, the problem that a BAP address cannot be changed in existing mechanisms may be solved.

Embodiment 5

The embodiment of this disclosure provides a wireless routing device, applicable to a first IAB-node. The device corresponds to the method described in Embodiment 1.

Figure 19:
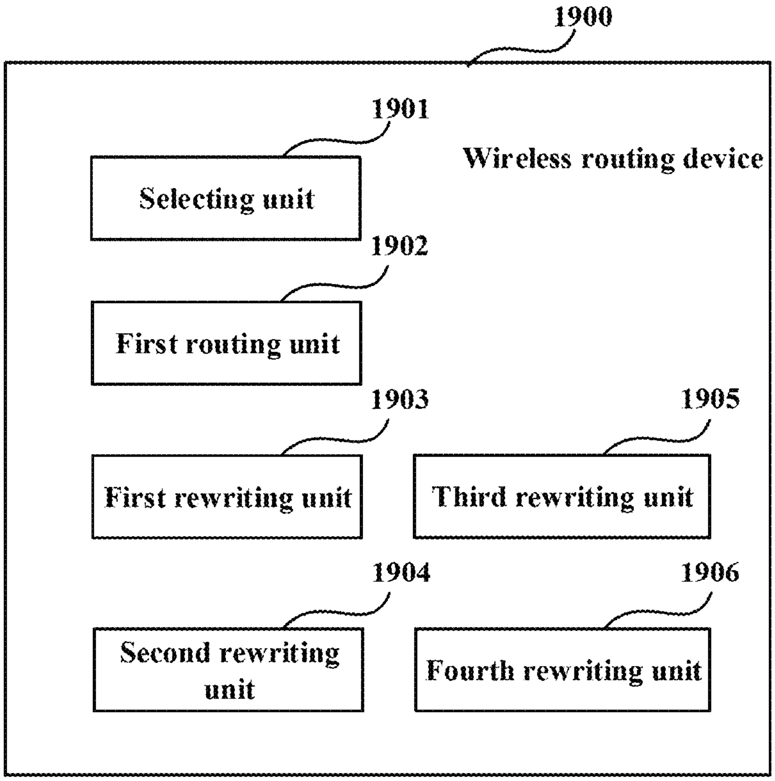
FIG. 19 is a schematic diagram of the wireless routing device of embodiment 5 of this disclosure.

FIG. 19 is a schematic diagram of the wireless routing device of embodiment 5 of this disclosure. As shown in FIG. 19, the device 1900 includes:

a selecting unit 1901 configured to, for data in an upstream direction, select an egress link without looking up a routing table, or, when a routing ambiguity occurs in looking up a routing table, select an egress link without using the routing table; and a first routing unit 1902 configured to perform routing according to a selected egress link.

In the embodiment of this disclosure, the selecting unit 1901 may select the egress link by looking up a first BAP header rewriting table.

For example, the selecting unit 1901 determines whether the first BAP header rewriting table comprises an entry of a routing ID in a BAP header of a BAP data packet in the upstream direction by looking up the first BAP header rewriting table.

In the embodiment of this disclosure, when the routing ID in the BAP header of the BAP data packet is identical to a previous routing ID in an entry of the first BAP header rewriting table, the selecting unit selects an egress link to which a parent node corresponds, the parent node being F1-terminated at an IAB-donor-CU different from that where the first IAB-node is F1-terminated; and/or, when the routing ID in the BAP header of the BAP data packet is different from previous routing IDs in all entries of the first BAP header rewriting table, the selecting unit selects an egress link to which a parent node corresponds, the parent node being F1-terminated at an IAB-donor-CU identical to that where the first IAB-node is F1-terminated.

In the embodiment of this disclosure, when a last RRC reconfiguration message received by the first IAB-node that contains at least one of a defaultUL-BAP-RoutingID and a defaultUL-BAP-BH-RLC-Channel comes from a parent node, a F1-termination donor of the parent node is identical to that of the first IAB-node-DU, and a F1-termination donor of another parent node of the first IAB is different from that of the first IAB-node, at least one of the defaultUL-BAP-RoutingID and defaultUL-BAP-BH-RLC-Channel being comprised in a first BAP configuration IE (bap-Config IE) in the RRC reconfiguration message.

It may also be that when a last RRC reconfiguration message containing a first BAP configuration IE (bap-Config IE) is received from a parent node of the first IAB-node, the parent node and the first IAB-node are F1-terminated to identical IAB-donor-CUs; and/or, when a last RRC reconfiguration message containing a second BAP configuration IE is received from a parent node of the first IAB-node, the parent node and the first IAB-node are F1-terminated to different IAB-donor-CUs.

In the embodiment of this disclosure, after the BAP data packet is received by a receiving part of a BAP entity of the first IAB-node-DU and transmitted to a transmitting part of a collocated BAP entity, the selecting unit 1901 determines whether there exists an entry of the routing ID in the BAP header of the BAP data packet in the first BAP header rewriting table by looking up the first BAP header rewriting table.

In the embodiment of this disclosure, when the first IAB-node is in dual connectivity and a radio link failure (RLF) occurs in a link between the first IAB-node and its parent node, the selecting unit 1901 selects an available egress link.

In the embodiment of this disclosure, the device 1900 may further include:

a first rewriting unit 1903 configured to look up a first BAP header rewriting table by using a routing ID of a BAP header of a BAP data packet in the upstream direction and determine whether to perform BAP header rewriting when the first IAB-node is in dual connectivity and no radio link failure occurs in links between the first IAB-node and its parent nodes; and/or, a second rewriting unit 1904 configured to look up a second BAP header rewriting table by using the routing ID of the BAP header of the BAP data packet and determine whether to perform BAP header rewriting when the first IAB-node is in dual connectivity and a radio link failure occurs in a link between the first IAB-node and its parent node.

In the embodiment of this disclosure, the device 1900 may further include:

a third rewriting unit 1905 configured to, when a first BAP header rewriting table is configured, look up the first BAP header rewriting table by using a routing ID of a BAP header of a BAP data packet first, when a matched new routing ID is found and a corresponding egress link is available, perform BAP header rewriting according to the first BAP header rewriting table, and when no matched new routing ID is found or a matched new routing ID is found but a corresponding egress link is unavailable, look up a second BAP header table and determine whether to perform BAP header rewriting.

In the embodiment of this disclosure, the device 1900 may further include:

a fourth rewriting unit 1906 configured to determine whether to perform BAP header rewriting according to a second BAP header rewriting table when a first BAP header rewriting table and the second BAP header rewriting table are configured.

In the embodiment of this disclosure, the first BAP header rewriting table and the second BAP header rewriting table are configured as two tables, or are configured as two separate entries in one table.

In the embodiment of this disclosure, reference may be made implementations of the steps in embodiment 1 for implementations of functions of the above units, which shall not be repeated herein any further.

It can be seen from the above embodiment that for the data in the upstream direction, the first IAB-node selects the egress link without looking up a routing table, or, when a routing ambiguity occurs in looking up a routing table, selects the egress link without using the routing table and performs routing, thereby avoiding routing ambiguities resulted from BAP address conflicts or routing identifier conflicts.

Embodiment 6

The embodiment of this disclosure provides a wireless routing device, applicable to a first IAB-node. The device corresponds to the method described in Embodiment 2.

Figure 20:
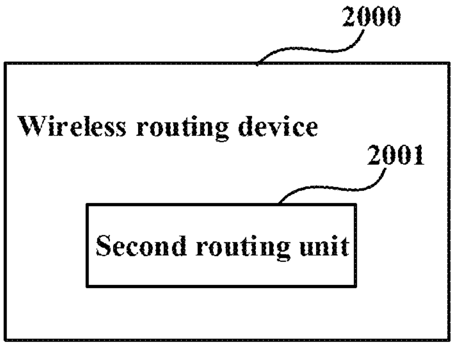
FIG. 20 is a schematic diagram of the wireless routing device of embodiment 6 of this disclosure.

FIG. 20 is a schematic diagram of the wireless routing device of embodiment 6 of this disclosure. As shown in FIG. 20, the device 2000 includes:

a second routing unit 2001 configured to, when a receiving part of a BAP entity of the first IAB-node receives a BAP data packet and delivers the BAP data packet to a transmitting part of a collocated BAP entity, only selects and routes an egress link to which a node connected to the collocated BAP entity corresponds.

For example, after the receiving part of the BAP entity of the first IAB-node receives the BAP data packet and delivers the BAP data packet to the transmitting part of the collocated BAP entity, when the second routing unit obtains a BAP address of a next hop corresponding to a routing ID of a BAP header by looking up a routing table and BAP addresses of two neighboring nodes of the first IAB-node are both identical to the BAP address of the next hop, the second routing unit 2001 selects and routes an egress link corresponding to a node in the two neighboring nodes connected to the collocated BAP entity.

Hence, a problem of routing ambiguity is solved.

Embodiment 7

The embodiment of this disclosure provides an apparatus for configuring a BAP address, applicable to an IAB-donor. The device corresponds to the method described in Embodiment 3.

Figure 21:
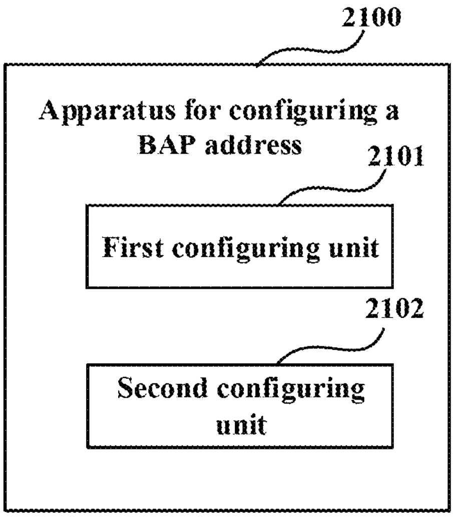
FIG. 21 is a schematic diagram of the apparatus for configuring a BAP address of embodiment 7 of this disclosure.

FIG. 21 is a schematic diagram of the apparatus for configuring a BAP address of embodiment 7 of this disclosure. As shown in FIG. 21, the apparatus 2100 includes:

a first configuring unit 2101 provided in a first IAB-donor-CU and configured to configure a BAP address for a DU of a first IAB-node; and a second configuring unit 2102 provided in a second IAB-donor-CU and configured to configure a BAP address for an MT of the first IAB-node.

For example, the BAP address of the first IAB-node-DU is used to manage a process of configuring a node of the first topology by the first IAB-donor-CU of the first IAB-node.

For example, the configuring a node of the first topology by the first IAB-donor-CU includes at least one of routing table configuration, BH RLC channel configuration and mapping, and UE context configuration.

For example, in a case where a cell of the first IAB-node DU is selected as a serving cell when the second IAB-node performs cell selection, the first IAB-donor-CU managing the first IAB-node performs cell group configuration (CellGroupConfig) on the second IAB-node via an RRC reconfiguration message, a BAP address (bap-Address) in the cell group configuration representing a BAP address of a parent node DU belonging to the cell group.

For example, in the scenario shown in FIG. 6, in cell selection, a new IAB-node 5 (not shown in FIG. 6) selects a cell of IAB-DU3 as a serving cell, and the serving cell is connected to IAB-node 3. IAB-donor-CU1 performs cell group configuration (CellGroupConfig) on IAB-node 5 via RRCReconfiguration, bap-Address in CellGroupConfig representing the BAP address of the parent node DU belonging to the cell group. It can also be said that bap-Address in CellGroupConfig represents a BAP address saved by the parent node belonging to the cell group in its F1-termination CU.

Hence, a problem of ambiguity in the use of multiple BAP addresses of the boundary IAB-node may be solved.

Embodiment 8

The embodiment of this disclosure provides an apparatus for configuring a BAP address, applicable to an IAB-donor. The device corresponds to the method described in Embodiment 4.

Figure 22:
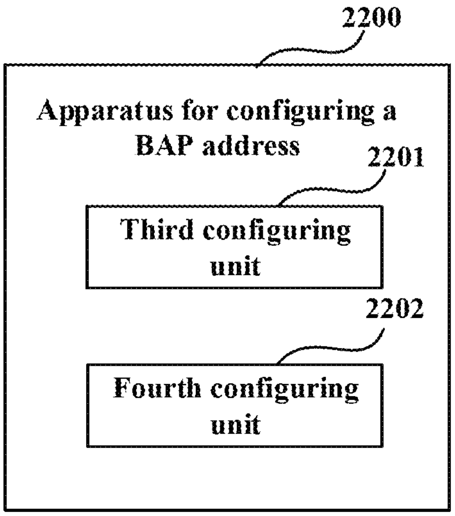
FIG. 22 is a schematic diagram of the apparatus for configuring a BAP address of embodiment 8 of this disclosure.

FIG. 22 is a schematic diagram of the apparatus for configuring a BAP address of embodiment 8 of this disclosure. As shown in FIG. 22, the apparatus includes a third configuring unit 2201 and a fourth configuring unit 2202.

The third configuring unit 2201 does not change a BAP address under management of the same IAB-donor-CU after configuring the BAP address for a BAP entity of an IAB-node.

When the IAB-donor-CU managing the IAB-node changes or adds a new IAB-donor, the fourth configuring unit 2202 in a CU of the changed or added IAB-donor reconfigures the BAP address of the BAP entity of the IAB-node.

Thus, the problem that the BAP address cannot be changed in existing mechanisms may be solved.

Embodiment 9

The embodiment of this disclosure provides a network device, including the wireless routing device as described in embodiment 5.

Figure 23:
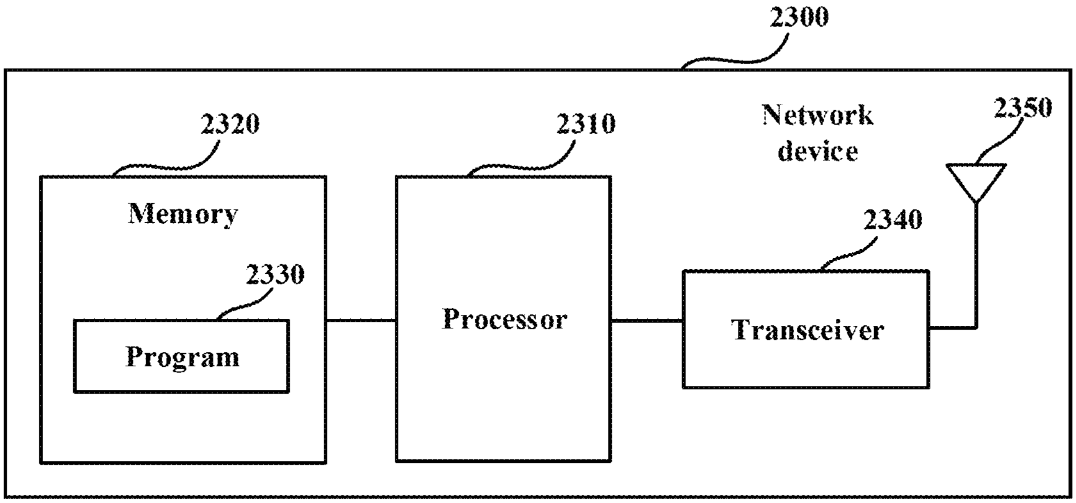
FIG. 23 is a block diagram of a systematic structure of the network device of embodiment 9 of this disclosure.

FIG. 23 is a block diagram of a systematic structure of the network device of embodiment 9 of this disclosure. As shown in FIG. 23, the network device 2300 may include a processor 2310 and a memory 2320, the memory 2320 being coupled to the processor 2310. Wherein, the memory 2320 may store various data, and furthermore, it may store a program 2330 for information processing, and execute the program 2330 under control of the processor 2310, so as to receive various information transmitted by a terminal equipment, and transmit various information to the terminal equipment.

In one implementation, functions of the wireless routing device may be integrated into the processor 2310.

For example, the processor 2310 may be configured to: for data in an upstream direction, select an egress link without looking up a routing table, or, when a routing ambiguity occurs in looking up a routing table, select an egress link without using the routing table; and perform routing according to a selected egress link.

In another implementation, the wireless routing device and the processor 2310 may be configured separately; for example, the wireless routing device may be configured as a chip connected to the processor 2310, and the functions of the wireless routing device are executed under control of the processor 2310.

Furthermore, as shown in FIG. 23, the network device 2300 may include a transceiver 2340, and an antenna 2350, etc. Wherein, functions of the above components are similar to those in the prior art, and shall not be described herein any further. It should be noted that the network device 2300 does not necessarily include all the parts shown in FIG. 23. Furthermore, the network device 2300 may include parts not shown in FIG. 23, and the prior art may be referred to.

It can be seen from the above embodiment that for the data in the upstream direction, the first IAB-node selects the egress link without looking up a routing table, thereby avoiding routing ambiguities resulted from BAP address conflicts or routing identifier conflicts.

Embodiment 10

The embodiment of this disclosure provides a communication system, including the network device described in embodiment 9.

Figure 24:
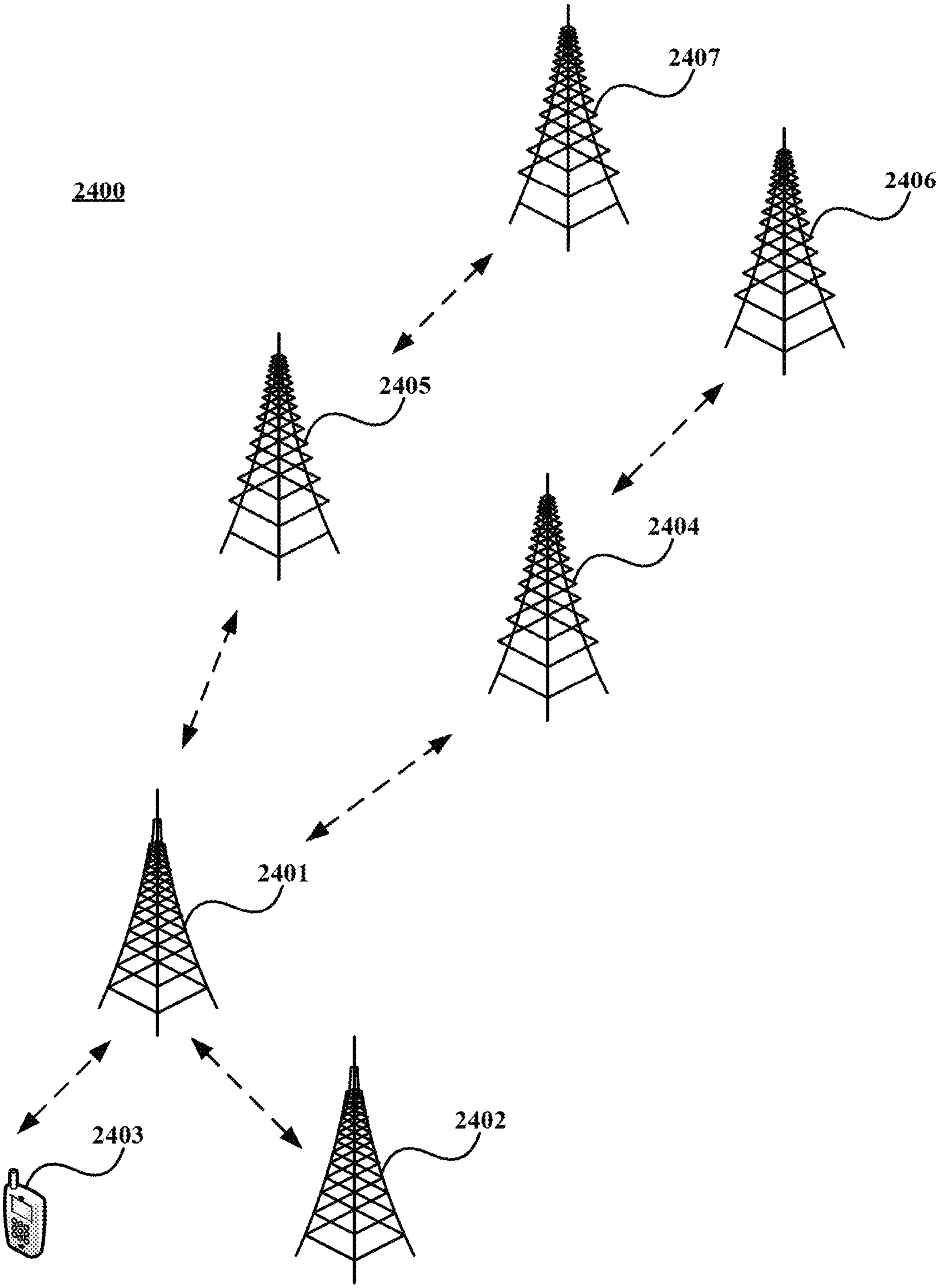
FIG. 24 is a schematic diagram of the communication system of embodiment 10 of this disclosure.

FIG. 24 is a schematic diagram of the communication system of embodiment 10 of this disclosure. As shown in FIG. 24, the communication system 2400 includes a first IAB-node 2401, a descendant IAB-node 2402 of the first IAB-node, a terminal equipment 2403 served by the first IAB-node, a first parent IAB-node 2404 and a second parent IAB-node 2405 of the first IAB-node, a first IAB-donor 2406 and a second IAB-donor 2407. The first IAB-node 2401 may be accessed to a network via the first parent IAB-node 2404 and the second parent IAB-node 2405, that is, it is in dual connectivity.

For example, the first IAB-node 2401 may be the network device described in embodiment 8, such as IAB-node 3 in FIG. 5.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

According to the implementations disclosed in the embodiments, following supplements are further disclosed.

Supplement I

1. A wireless routing device, applicable to a first IAB-node, the device including:

a selecting unit configured to, for data in an upstream direction, select an egress link without looking up a routing table, or, when a routing ambiguity occurs in looking up a routing table, select an egress link without using the routing table; and a first routing unit configured to perform routing according to a selected egress link.

2. The device according to supplement 1, wherein, the selecting unit selects the egress link by looking up a first BAP header rewriting table.

3. The device according to supplement 2, wherein, the selecting unit determines whether the first BAP header rewriting table includes an entry of a routing ID in a BAP header of a BAP data packet in the upstream direction by looking up the first BAP header rewriting table.

4. The device according to supplement 3, wherein, when the routing ID in the BAP header of the BAP data packet is identical to a previous routing ID in an entry of the first BAP header rewriting table, the selecting unit selects an egress link to which a parent node corresponds, the parent node being F1-terminated at an IAB-donor-CU different from that where the first IAB-node is F1-terminated; and/or, when the routing ID in the BAP header of the BAP data packet is different from previous routing IDs in all entries of the first BAP header rewriting table, the selecting unit selects an egress link to which a parent node corresponds, the parent node being F1-terminated at an IAB-donor-CU identical to that where the first IAB-node is F1-terminated.

5. The device according to supplement 4, wherein, when a last RRC reconfiguration message received by the first IAB-node that contains at least one of a defaultUL-BAP-RoutingID and a defaultUL-BAP-BH-RLC-Channel comes from a parent node, a F1-termination donor of the parent node is identical to that of the first IAB-node-DU, and a F1-termination donor of another parent node of the first IAB is different from that of the first IAB-node, at least one of the defaultUL-BAP-RoutingID and defaultUL-BAP-BH-RLC-Channel being included in a first BAP configuration IE (bap-Config IE) in the RRC reconfiguration message.

6. The device according to supplement 4, wherein, when a last RRC reconfiguration message containing a first BAP configuration IE (bap-Config IE) is received from a parent node of the first IAB-node, the parent node and the first IAB-node are F1-terminated to identical IAB-donor-CUs; and/or, when a last RRC reconfiguration message containing a second BAP configuration IE is received from a parent node of the first IAB-node, the parent node and the first IAB-node are F1-terminated to different IAB-donor-CUs.

7. The device according to supplement 3, wherein, after the BAP data packet is received by a receiving part of a BAP entity of the first IAB-node-DU and transmitted to a transmitting part of a collocated BAP entity, the selecting unit determines whether there exists an entry of the routing ID in the BAP header of the BAP data packet in the first BAP header rewriting table by looking up the first BAP header rewriting table.

8. The device according to supplement 1, wherein the selecting an egress link includes:

when the first IAB-node is in dual connectivity and a radio link failure (RLF) occurs in a link between the first IAB-node and its parent node, selecting an available egress link by the selecting unit.

9. The device according to supplement 1, wherein the device further includes:

a first rewriting unit configured to look up a first BAP header rewriting table by using a routing ID of a BAP header of a BAP data packet in the upstream direction and determine whether to perform BAP header rewriting when the first IAB-node is in dual connectivity and no radio link failure occurs in links between the first IAB-node and its parent nodes; and/or, a second rewriting unit configured to look up a second BAP header rewriting table by using the routing ID of the BAP header of the BAP data packet and determine whether to perform BAP header rewriting when the first IAB-node is in dual connectivity and a radio link failure occurs in a link between the first IAB-node and its parent node.

10. The device according to supplement 1, wherein the device further includes:

a third rewriting unit configured to, when a first BAP header rewriting table is configured, look up the first BAP header rewriting table by using a routing ID of a BAP header of a BAP data packet first, when a matched new routing ID is found and a corresponding egress link is available, perform BAP header rewriting according to the first BAP header rewriting table, and when no matched new routing ID is found or a matched new routing ID is found but a corresponding egress link is unavailable, look up a second BAP header table and determine whether to perform BAP header rewriting.

11. The device according to supplement 1, wherein the device further includes:

a fourth rewriting unit configured to determine whether to perform BAP header rewriting according to a second BAP header rewriting table when a first BAP header rewriting table and the second BAP header rewriting table are configured.

12. The device according to any one of supplements 9-11, wherein, the first BAP header rewriting table and the second BAP header rewriting table are configured as two tables, or are configured as two separate entries in one table.

13. The device according to any one of supplements 1-12, wherein, an MT and DU of the first IAB-node are respectively configured with a BAP address.

14. The device according to supplement 13, wherein, the BAP address of the first IAB-node-DU is used to manage a process of configuration of a node of a first topology by the first IAB-donor-CU of the first IAB-node.

15. The device according to supplement 14, wherein, the configuration of a node of a first topology by the first IAB-donor-CU includes at least one of routing table configuration, BH RLC Channel configuration and mapping, and UE context configuration.

16. The device according to supplement 13, wherein, in a case where a second IAB-node selects a cell of the first IAB-node-DU as a serving cell, the first IAB-donor-CU managing the first IAB-node performs cell group configuration (CellGroupConfig) for the second IAB-node via an RRC reconfiguration message, a BAP address (bap-Address) in the cell group configuration representing a BAP address of a parent node DU belonging to the cell group.

17. The device according to any one of supplements 1-16, wherein, the IAB-DU of the first IAB-node and a parent node of the first IAB-node are F1-terminated to different IAB-donor-CUs.

18. The device according to any one of supplements 1-12, wherein, after a BAP address is configured for a BAP entity of an IAB-node, the BAP address is not changed under management of identical IAB-donor-CU.

19. The device according to supplement 18, wherein, when the IAB-donor-CU managing the IAB-node changes or adds a new IAB-donor, a CU of the changed or added IAB-donor reconfigures the BAP address of the BAP entity of the IAB-node.

20. A wireless routing device, applicable to a first IAB-node, the device including:

a second routing unit configured to, when a receiving part of a BAP entity of the first IAB-node receives a BAP data packet and delivers the BAP data packet to a transmitting part of a collocated BAP entity, only selects and routes an egress link to which a node connected to the collocated BAP entity corresponds.

21. The device according to supplement 20, wherein, after the receiving part of the BAP entity of the first IAB-node receives the BAP data packet and delivers the BAP data packet to the transmitting part of the collocated BAP entity, when the second routing unit obtains a BAP address of a next hop corresponding to a routing ID of a BAP header by looking up a routing table and BAP addresses of two neighboring nodes of the first IAB-node are both identical to the BAP address of the next hop, the second routing unit selects and routes an egress link corresponding to a node in the two neighboring nodes connected to the collocated BAP entity.

22. An apparatus for configuring a BAP address, the apparatus including:

a first configuring unit provided in a first IAB-donor-CU and configured to configure a BAP address for a DU of a first IAB-node; and a second configuring unit provided in a second IAB-donor-CU and configured to configure a BAP address for an MT of the first IAB-node.

23. The device according to supplement 22, wherein, in a process of configuring a node of the first topology by the first IAB-donor-CU, the BAP address of the first IAB-node-DU is used.

24. The device according to supplement 23, wherein, the configuring a node of the first topology by the first IAB-donor-CU includes at least one of routing table configuration, BH RLC channel configuration and mapping, and UE context configuration.

25. The device according to supplement 22, wherein, in a case where a cell of the first IAB-node DU is selected as a serving cell when the second IAB-node performs cell selection, the first IAB-donor-CU performs cell group configuration (CellGroupConfig) on the second IAB-node via an RRC reconfiguration message, a BAP address (bap-Address) in the cell group configuration representing a BAP address of a parent node DU belonging to the cell group.

26. An apparatus for configuring a BAP address, the apparatus including:

a third configuring unit configured not to change a BAP address under management of the same IAB-donor-CU after configuring the BAP address for a BAP entity of an IAB-node.

27. The device according to supplement 26, wherein, when the IAB-donor-CU managing the IAB-node changes or adds a new IAB-donor, a fourth configuring unit in a CU of the changed or added IAB-donor reconfigures the BAP address of the BAP entity of the IAB-node.

28. A network device, including the device as described in any one of supplements 1-21.

29. A network device, including the device as described in any one of supplements 22-27.

30. A communication system, including the network device as described in supplement 28 and/or the network device as described in supplement 29.

Supplement II

1. A wireless routing method, applicable to a first IAB-node, the method including:

for data in an upstream direction, selecting an egress link without looking up a routing table, or, when a routing ambiguity occurs in looking up a routing table, selecting an egress link without using the routing table; and performing routing according to a selected egress link.

2. The method according to supplement 1, wherein the selecting the egress link includes:

selecting the egress link by looking up a first BAP header rewriting table.

3. The method according to supplement 2, wherein the selecting the egress link by looking up a first BAP header rewriting table includes:

determining whether the first BAP header rewriting table includes an entry of a routing ID in a BAP header of a BAP data packet in the upstream direction by looking up the first BAP header rewriting table.

4. The method according to supplement 3, wherein, when the routing ID in the BAP header of the BAP data packet is identical to a previous routing ID in an entry of the first BAP header rewriting table, an egress link to which a parent node corresponds is selected, the parent node being F1-terminated at an IAB-donor-CU different from that where the first IAB-node is F1-terminated; and/or, when the routing ID in the BAP header of the BAP data packet is different from previous routing IDs in all entries of the first BAP header rewriting table, an egress link to which a parent node corresponds is selected, the parent node being F1-terminated at an IAB-donor-CU identical to that where the first IAB-node is F1-terminated.

5. The method according to supplement 4, wherein, when a last RRC reconfiguration message received by the first IAB-node that contains at least one of a defaultUL-BAP-RoutingID and a defaultUL-BAP-BH-RLC-Channel comes from a parent node, a F1-termination donor of the parent node is identical to that of the first IAB-node-DU, and a F1-termination donor of another parent node of the first IAB is different from that of the first IAB-node, at least one of the defaultUL-BAP-RoutingID and defaultUL-BAP-BH-RLC-Channel being included in a first BAP configuration IE (bap-Config IE) in the RRC reconfiguration message.

6. The method according to supplement 4, wherein, when a last RRC reconfiguration message containing a first BAP configuration IE (bap-Config IE) is received from a parent node of the first IAB-node, the parent node and the first IAB-node are F1-terminated to identical IAB-donor-CUs; and/or, when a last RRC reconfiguration message containing a second BAP configuration IE is received from a parent node of the first IAB-node, the parent node and the first IAB-node are F1-terminated to different IAB-donor-CUs.

7. The method according to supplement 3, wherein, after the BAP data packet is received by a receiving part of a BAP entity of the first IAB-node-DU and transmitted to a transmitting part of a collocated BAP entity, whether there exists an entry of the routing ID in the BAP header of the BAP data packet in the first BAP header rewriting table is determined by looking up the first BAP header rewriting table.

8. The method according to supplement 1, wherein the selecting an egress link includes:

when the first IAB-node is in dual connectivity and a radio link failure (RLF) occurs in a link between the first IAB-node and its parent node, selecting an available egress link.

9. The method according to supplement 1, wherein the method further includes:

looking up a first BAP header rewriting table by using a routing ID of a BAP header of a BAP data packet in the upstream direction and determining whether to perform BAP header rewriting when the first IAB-node is in dual connectivity and no radio link failure occurs in links between the first IAB-node and its parent nodes; and/or, looking up a second BAP header rewriting table by using the routing ID of the BAP header of the BAP data packet and determining whether to perform BAP header rewriting when the first IAB-node is in dual connectivity and a radio link failure occurs in a link between the first IAB-node and its parent node.

10. The method according to supplement 1, wherein the method further includes:

when a first BAP header rewriting table is configured, looking up the first BAP header rewriting table by using a routing ID of a BAP header of a BAP data packet first, when a matched new routing ID is found and a corresponding egress link is available, performing BAP header rewriting according to the first BAP header rewriting table, and when no matched new routing ID is found or a matched new routing ID is found but a corresponding egress link is unavailable, looking up a second BAP header table and determining whether to perform BAP header rewriting.

11. The method according to supplement 1, wherein the method further includes:

determining whether to perform BAP header rewriting according to a second BAP header rewriting table when a first BAP header rewriting table and the second BAP header rewriting table are configured.

12. The method according to any one of supplements 9-11, wherein, the first BAP header rewriting table and the second BAP header rewriting table are configured as two tables, or are configured as two separate entries in one table.

13. The method according to any one of supplements 1-12, wherein, an MT and DU of the first IAB-node are respectively configured with a BAP address.

14. The method according to supplement 13, wherein, the BAP address of the first IAB-node-DU is used to manage a process of configuration of a node of a first topology by the first IAB-donor-CU of the first IAB-node.

15. The method according to supplement 14, wherein, the configuration of a node of a first topology by the first IAB-donor-CU includes at least one of routing table configuration, BH RLC Channel configuration and mapping, and UE context configuration.

16. The method according to supplement 13, wherein, in a case where a second IAB-node selects a cell of the first IAB-node-DU as a serving cell, the first IAB-donor-CU managing the first IAB-node performs cell group configuration (CellGroupConfig) for the second IAB-node via an RRC reconfiguration message, a BAP address (bap-Address) in the cell group configuration representing a BAP address of a parent node DU belonging to the cell group.

17. The method according to any one of supplements 1-16, wherein, the IAB-DU of the first IAB-node and a parent node of the first IAB-node are F1-terminated to different IAB-donor-CUs.

18. The method according to any one of supplements 1-12, wherein, after a BAP address is configured for a BAP entity of an IAB-node, the BAP address is not changed under management of identical IAB-donor-CU.

19. The method according to supplement 18, wherein, when the IAB-donor-CU managing the IAB-node changes or adds a new IAB-donor, a CU of the changed or added IAB-donor reconfigures the BAP address of the BAP entity of the IAB-node.

20. A wireless routing method, applicable to a first IAB-node, the method including:

when a receiving part of a BAP entity of the first IAB-node receives a BAP data packet and delivers the BAP data packet to a transmitting part of a collocated BAP entity, only selecting and routing an egress link to which a node connected to the collocated BAP entity corresponds.

21. The method according to supplement 20, wherein, after the receiving part of the BAP entity of the first IAB-node receives the BAP data packet and delivers the BAP data packet to the transmitting part of the collocated BAP entity, when a BAP address of a next hop corresponding to a routing ID of a BAP header is obtained by looking up a routing table and BAP addresses of two neighboring nodes of the first IAB-node are both identical to the BAP address of the next hop, an egress link corresponding to a node in the two neighboring nodes connected to the collocated BAP entity is selected and routed.

22. A method for configuring a BAP address, the method including:

configuring a BAP address for a DU of a first IAB-node by a first IAB-CU; and configure a BAP address for an MT of the first IAB-node by a second IAB-donor-CU.

23. The method according to supplement 22, wherein, in a process of configuring a node of the first topology by the first IAB-donor-CU, the BAP address of the first IAB-node-DU is used.

24. The method according to supplement 23, wherein, the configuring a node of the first topology by the first IAB-donor-CU includes at least one of routing table configuration, BH RLC channel configuration and mapping, and UE context configuration.

25. The method according to supplement 22, wherein, in a case where a cell of the first IAB-node DU is selected as a serving cell when the second IAB-node performs cell selection, the first IAB-donor-CU performs cell group configuration (CellGroupConfig) on the second IAB-node via an RRC reconfiguration message, a BAP address (bap-Address) in the cell group configuration representing a BAP address of a parent node DU belonging to the cell group.

26. An method for configuring a BAP address, the method including:

not changing a BAP address under management of the same IAB-donor-CU after configuring the BAP address for a BAP entity of an IAB-node.

27. The method according to supplement 26, wherein, when the IAB-donor-CU managing the IAB-node changes or adds a new IAB-donor, the changed or added IAB-donor reconfigures the BAP address of the BAP entity of the IAB-node.

The invention claimed is:

1. A wireless routing device, applicable to a first IAB (Integrated Access and Backhaul) node, the device comprising:

processor circuitry configured to, for a BAP (Backhaul Adaptation Protocol) data packet, rewrite a BAP routing ID (identification) in a BAP header of the BAP data packet according to a first BAP header rewriting configuration;

for the BAP data packet in upstream direction, rewrite the BAP routing ID in the BAP header according to a second BAP header rewriting configuration;

when a first BAP header rewriting configuration is configured, look up the first BAP header rewriting configuration by using a routing ID of a BAP header of a BAP data packet;

when a matched egress routing ID is found and a corresponding egress link is available, perform BAP header rewriting according to the first BAP header rewriting configuration; and when no matched egress routing ID is found or a matched egress routing ID is found but a corresponding egress link is unavailable, look up a second BAP header rewriting configuration and determine whether to perform BAP header rewriting.

2. The device according to claim 1, wherein, the processor circuitry selects an egress link by looking up the first BAP header rewriting configuration.

3. The device according to claim 1, wherein, the processor circuitry determines whether the first BAP header rewriting configuration comprises an entry of a BAP routing ID in a BAP header of a BAP data packet by looking up the first BAP header rewriting configuration.

4. The device according to claim 3, wherein, when the BAP routing ID in the BAP header of the BAP data packet is identical to an ingress routing ID in an entry of the first BAP header rewriting configuration, the processor circuitry rewrites the BAP header with an egress routing ID mapped with the ingress routing ID.

5. The device according to claim 3, wherein, after the BAP data packet is received by a receiving part of a BAP entity of the first IAB-node and transmitted to a transmitting part of a collocated BAP entity, the processor circuitry determines whether there exists an entry of the routing ID in the BAP header of the BAP data packet in the first BAP header rewriting configuration by looking up the first BAP header rewriting configuration.

6. The device according to claim 1, wherein, the first BAP header rewriting configuration is for transmission between topologies.

7. The device according to claim 6, wherein, when the first BAP header rewriting configuration is for upstream traffic, the egress routing ID corresponds to a routing ID in a second topology, which is controlled by a non-F1-terminating donor-CU (Central Unit).

8. The device according to claim 1, wherein:

the first BAP header rewriting configuration is configured by an F1-terminating donor-CU (Central Unit) of the first IAB node.

9. The device according to claim 1, wherein:

the second BAP header rewriting configuration is for upstream inter-donor-DU re-routing, and the BAP header rewriting is to rewrite the BAP Routing ID towards one donor-DU to a BAP Routing ID towards an alternative donor-DU.

10. The device according to claim 1, wherein:

the first IAB node is a boundary IAB node.

11. The device according to claim 1, wherein, an MT (Mobile Termination) and DU (Distributed Unit) of the first IAB-node are respectively configured with a BAP address.

12. The device according to claim 11, wherein, the BAP address of a DU of the first is used to manage a process of configuration of a node of a first topology by a first IAB-donor-CU of the first IAB-node.

13. The device according to claim 12, wherein, the configuration of a node of a first topology by the first IAB-donor-CU comprises at least one of routing table configuration, BH RLC Channel configuration and mapping, and UE context configuration.

14. The device according to claim 11, wherein, in a case where a second IAB-node selects a cell of the DU of the first IAB-node as a serving cell, the first IAB-donor-CU managing the first IAB-node performs cell group configuration (CellGroupConfig) for the second IAB-node via an RRC reconfiguration message, a BAP address (bap-Address) in the cell group configuration representing a BAP address of a parent node DU belonging to the cell group configured by the cell group configuration.

15. The device according to claim 1, wherein, the IAB-DU (Distributed Unit) of the first IAB-node and a parent node of the first IAB-node are F1-terminated to different IAB-donor-CUs.

16. The device according to claim 1, wherein,
after a BAP address is configured for a BAP entity of an IAB-node, the BAP address is not changed under management of identical IAB-donor-CU.

17. The device according to claim 16, wherein,
when the IAB-donor-CU of the IAB node changes or a new IAB-donor-CU is added, a changed or added IAB-donor-CU reconfigures BAP address of the IAB node.

18. A network device, applicable to a first IAB (Integrated Access and Backhaul) node, the device comprising:
processor circuitry configured to:
for a BAP (Backhaul Adaptation Protocol) data packet, rewrite a BAP routing ID (identification) in a BAP header of the BAP data packet according to a first BAP header rewriting configuration;
for the BAP data packet in upstream direction, rewrite the BAP routing ID in the BAP header according to a second BAP header rewriting configuration;
when a first BAP header rewriting configuration is configured, look up the first BAP header rewriting configuration by using a routing ID of a BAP header of a BAP data packet;
when a matched egress routing ID is found and a corresponding egress link is available, perform BAP header rewriting according to the first BAP header rewriting configuration; and
when no matched egress routing ID is found or a matched egress routing ID is found but a corresponding egress link is unavailable, look up a second BAP header rewriting configuration and determine whether to perform BAP header rewriting.

* * * * *